(12) United States Patent
Lasser et al.

(10) Patent No.: US 10,462,177 B1
(45) Date of Patent: Oct. 29, 2019

(54) TAKING PRIVILEGE ESCALATION INTO ACCOUNT IN PENETRATION TESTING CAMPAIGNS

(71) Applicant: XM Cyber Ltd., Hertsliya (IL)

(72) Inventors: Menahem Lasser, Kohav-Yair (IL); Ronen Segal, Hertzelia (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 16/432,982

(22) Filed: Jun. 6, 2019

Related U.S. Application Data

(60) Provisional application No. 62/801,700, filed on Feb. 6, 2019.

(51) Int. Cl.
*H04L 29/00* (2006.01)
*H04L 29/06* (2006.01)
*G06F 8/61* (2018.01)

(52) U.S. Cl.
CPC ............ *H04L 63/1433* (2013.01); *G06F 8/61* (2013.01); *H04L 63/20* (2013.01)

(58) Field of Classification Search
CPC ........ H04L 63/1433; H04L 63/20; G06F 8/61
See application file for complete search history.

(56) References Cited

U.S. PATENT DOCUMENTS

| 6,918,038 | B1 | 7/2005 | Smith et al. |
| 6,952,779 | B1 | 10/2005 | Cohen et al. |
| 7,013,395 | B1 | 3/2006 | Swiler et al. |
| 7,296,092 | B2 | 11/2007 | Nguyen |
| 7,757,293 | B2 | 7/2010 | Caceres et al. |
| 8,001,589 | B2 | 8/2011 | Ormazabal et al. |
| 8,112,016 | B2 | 2/2012 | Matsumoto et al. |
| 8,127,359 | B2 | 2/2012 | Kelekar |

(Continued)

FOREIGN PATENT DOCUMENTS

| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Don G Zhao
(74) *Attorney, Agent, or Firm* — Marc Van Dyke; Fourth Dimension IP

(57) ABSTRACT

A simulated penetration testing system that assigns network nodes of the tested networked system to classes based on current information about the compromisability of the nodes at a current state of a penetration testing campaign, the classes consisting of (i) a red class for nodes known to be compromisable by the attacker in a way that gives the attacker full control of the nodes, (ii) a blue class for nodes that are not known to be compromisable by the attacker, and (iii) a purple class for nodes known to be compromisable by the attacker in a way that does not give the attacker full control of the purple-class-member network node. The campaign tests whether an attacker would be able to achieve full control of a target node by using privilege escalation techniques and one or more access rights achieved by compromising the target node.

20 Claims, 15 Drawing Sheets

(56) References Cited

U.S. PATENT DOCUMENTS

| | | | |
|---|---|---|---|
| 8,356,353 B2 | 1/2013 | Futoransky et al. | |
| 8,365,289 B2 | 1/2013 | Russ et al. | |
| 8,490,193 B2 | 7/2013 | Yamada et al. | |
| 8,650,651 B2 | 2/2014 | Podjarny et al. | |
| 8,700,767 B2 | 4/2014 | Cole | |
| 8,813,235 B2 | 8/2014 | Sidagni | |
| 9,015,847 B1 | 4/2015 | Kaplan et al. | |
| 9,076,013 B1 | 7/2015 | Bailey, Jr. et al. | |
| 9,183,397 B2 | 11/2015 | Futoransky et al. | |
| 9,224,117 B2 | 12/2015 | Chapman | |
| 9,270,696 B2 | 2/2016 | Fritzson et al. | |
| 9,276,952 B2 | 3/2016 | Simpson et al. | |
| 9,292,695 B1 | 3/2016 | Bassett | |
| 9,350,753 B2 | 5/2016 | Kaplan et al. | |
| 9,467,467 B2 | 10/2016 | Alamuri | |
| 9,473,522 B1 | 10/2016 | Kotler et al. | |
| 9,558,355 B2 | 1/2017 | Madou et al. | |
| 9,760,716 B1 | 9/2017 | Mulchandani | |
| 9,800,603 B1 | 10/2017 | Sidagni | |
| 10,038,711 B1 | 7/2018 | Gorodissky et al. | |
| 10,068,095 B1 | 9/2018 | Segal et al. | |
| 10,122,750 B2 | 11/2018 | Gorodissky et al. | |
| 10,257,220 B2 | 4/2019 | Gorodissky | |
| 2003/0126252 A1* | 7/2003 | Abir | H04L 63/1458 709/223 |
| 2004/0255146 A1* | 12/2004 | Asher | G06F 9/44 726/16 |
| 2005/0086502 A1 | 4/2005 | Rayes et al. | |
| 2005/0102534 A1 | 5/2005 | Wong | |
| 2006/0041936 A1* | 2/2006 | Anderson | H04L 63/02 726/11 |
| 2006/0098649 A1* | 5/2006 | Shay | H04L 63/102 370/389 |
| 2006/0212572 A1* | 9/2006 | Afek | H04L 63/145 709/225 |
| 2006/0267802 A1* | 11/2006 | Judge | H04L 41/12 340/995.1 |
| 2007/0204347 A1 | 8/2007 | Caceres et al. | |
| 2008/0209567 A1 | 8/2008 | Lockhart et al. | |
| 2008/0256638 A1 | 10/2008 | Russ et al. | |
| 2008/0288822 A1 | 11/2008 | Wu et al. | |
| 2009/0044277 A1 | 2/2009 | Aaron | |
| 2009/0049553 A1 | 2/2009 | Vasudeva | |
| 2009/0172813 A1 | 7/2009 | Aaron | |
| 2010/0138925 A1 | 6/2010 | Barai et al. | |
| 2011/0035803 A1 | 2/2011 | Obes et al. | |
| 2012/0174228 A1 | 7/2012 | Giakouminakis et al. | |
| 2012/0255022 A1 | 10/2012 | Ocepek et al. | |
| 2012/0323717 A1* | 12/2012 | Kirsch | G06Q 20/0855 705/26.1 |
| 2013/0014263 A1 | 1/2013 | Porcello et al. | |
| 2013/0031635 A1 | 1/2013 | Lotem et al. | |
| 2013/0291100 A1* | 10/2013 | Ganapathy | H04W 4/70 726/22 |
| 2014/0137257 A1 | 5/2014 | Martinez et al. | |
| 2014/0173739 A1 | 6/2014 | Ahuja et al. | |
| 2014/0237606 A1 | 8/2014 | Futoransky et al. | |
| 2016/0044057 A1 | 2/2016 | Chenette et al. | |
| 2016/0234251 A1 | 8/2016 | Boice et al. | |
| 2016/0234661 A1 | 8/2016 | Narasimhan et al. | |
| 2016/0248800 A1 | 8/2016 | Ng et al. | |
| 2016/0275289 A1 | 9/2016 | Sethumadhavan et al. | |
| 2016/0342796 A1 | 11/2016 | Kaplan et al. | |
| 2016/0352771 A1 | 12/2016 | Sivan et al. | |
| 2017/0006055 A1 | 1/2017 | Strom et al. | |
| 2017/0013008 A1 | 1/2017 | Carey et al. | |
| 2017/0046519 A1 | 2/2017 | Cam | |
| 2017/0063886 A1 | 3/2017 | Muddu et al. | |
| 2017/0098086 A1 | 4/2017 | Hoernecke et al. | |
| 2017/0104780 A1 | 4/2017 | Zaffarano et al. | |
| 2017/0116421 A1 | 4/2017 | M C et al. | |
| 2017/0206376 A1* | 7/2017 | Sher-Jan | G06F 21/6245 |
| 2017/0279843 A1 | 9/2017 | Schultz et al. | |
| 2017/0339170 A1* | 11/2017 | Teuton | H04L 63/1416 |
| 2017/0373923 A1 | 12/2017 | Kazachkov et al. | |
| 2018/0018465 A1 | 1/2018 | Carey et al. | |
| 2018/0039794 A1* | 2/2018 | Sher-Jan | H04W 12/02 |
| 2018/0219900 A1* | 8/2018 | Gorodissky | H04L 63/1433 |
| 2018/0219901 A1 | 8/2018 | Gorodissky et al. | |
| 2018/0219903 A1 | 8/2018 | Segal | |
| 2018/0219904 A1 | 8/2018 | Gorodissky et al. | |
| 2018/0219905 A1 | 8/2018 | Gorodissky et al. | |
| 2018/0219909 A1* | 8/2018 | Gorodissky | H04L 43/50 |
| 2018/0239902 A1* | 8/2018 | Godard | G06F 21/552 |
| 2018/0270268 A1* | 9/2018 | Gorodissky | H04L 43/50 |
| 2018/0365429 A1* | 12/2018 | Segal | G06F 21/577 |
| 2019/0014141 A1* | 1/2019 | Segal | G06F 21/554 |
| 2019/0036961 A1 | 1/2019 | Gorodissky et al. | |
| 2019/0068631 A1* | 2/2019 | Ashkenazy | H04L 63/1433 |
| 2019/0081974 A1* | 3/2019 | Lasser | H04L 63/1433 |
| 2019/0149572 A1* | 5/2019 | Gorodissky | H04L 63/1433 |
| 2019/0182286 A1* | 6/2019 | Zini | H04L 63/1433 |

FOREIGN PATENT DOCUMENTS

| | | |
|---|---|---|
| CN | 104009881 A | 8/2014 |
| EP | 1559008 A1 | 8/2005 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016164844 A1 | 10/2016 |
| WO | 2018156394 A1 | 8/2018 |

OTHER PUBLICATIONS

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

"High Bit Security, LLC External Penetration Test Report for org X, Inc." downloaded from High Bit website on Dec. 26, 2018.

"MegaCorp One Penetration Test Report" Aug. 10, 2013.

* cited by examiner

|  | Start | $S_X$ | $S_Y$ | $S_Z$ | End |
|---|---|---|---|---|---|
| NODE $110_A$ | BLUE | PURPLE | RED | RED | RED |
| NODE $110_B$ | BLUE | BLUE | RED | RED | RED |
| NODE $110_C$ | BLUE | BLUE | PURPLE | PURPLE | PURPLE |
| NODE $110_D$ | BLUE | BLUE | BLUE | BLUE | BLUE |
| NODE $110_E$ | PURPLE | PURPLE | PURPLE | RED | RED |

FIG. 1

Select S11 a first target network node of the plurality of network nodes of the networked system Handle S12 the first network target, the handling of the first target network node comprising: (a) determining a first vulnerability that can compromise the first target network node based on the selected first target network node and based on the current assignment of the plurality of network nodes to the blue, red and purple classes; (b) checking whether compromising the first target network node using the first vulnerability would result in the attacker achieving full control of the first target network node; and (c) assigning the first target network node to the red class in response to determining that the compromising of the first target network node using the first vulnerability would result in the attacker achieving full control of the first target network node Select S13 a second target network node of the plurality of network nodes of the networked system Handle S14 the second network target, the handling of the second target network node comprising: (a) determining a second vulnerability that can compromise the second target network node based on the selected second target network node and based on the current assignment of the plurality of network nodes to the blue, red and purple classes; (b) checking whether compromising the second target network node using the second vulnerability would result in the attacker achieving full control of the second target network node; and (c) assigning the second target network node to the red class in response to determining that (i) the compromising of the second target network node using the second vulnerability would not result in the attacker achieving full control of the second target network node and (ii) the attacker would be able to achieve full control of the second target network node by using (A) one or more privilege escalation techniques and (B) one or more access rights to the second target network node obtained by the compromising of the second target network node using the second vulnerability Select S15 a third target network node of the plurality of network nodes of the networked system

CONTINUES IN FIG. 12B

FIG. 12A

CONTINUES FROM FIG. 12A

Handle S16 the third network target, the handling of the third target network node comprising: (a) determining a third vulnerability that can compromise the second target network node based on the selected third target network node and based on the current assignment of the plurality of network nodes to the blue, red and purple classes; (b) checking whether compromising the third target network node using the third vulnerability would result in the attacker achieving full control of the third target network node; and (c) assigning the second target network node to the purple class in response to determining that (i) the compromising of the third target network node using the third vulnerability would not result in the attacker achieving full control of the third target network node and (ii) the attacker cannot achieve full control of the third target network node by using (A) any combination of privilege escalation techniques and (B) any combination of access rights to the third target network node obtained by the compromising of the third target network node using the third vulnerability Determine S17 the way for an attacker to compromise the networked system based on at least one of the first vulnerability, the second vulnerability and the third vulnerability Report S18 the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system

FIG. 12B

TAKING PRIVILEGE ESCALATION INTO ACCOUNT IN PENETRATION TESTING CAMPAIGNS

CROSS-REFERENCE TO RELATED APPLICATIONS

This patent application claims the benefit of U.S. Provisional Patent Application No. 62/801,700 filed on Feb. 6, 2019, which is incorporated herein by reference in its entirety.

FIELD OF THE INVENTION

The present invention relates to systems and methods for penetration testing of networked systems, based on assigning network nodes to classes associated with currently known levels of compromisability at any given time during the execution of a penetration testing campaign. In particular, the present invention is suitable for penetration testing of networked systems in which network nodes are susceptible to attackers using privilege escalation techniques to escalate their access rights within nodes and to gain full control of those nodes.

BACKGROUND

There is currently a proliferation of organizational networked systems. Every type of organization, be it a commercial company, a university, a bank, a government agency or a hospital, heavily relies on one or more networks interconnecting multiple computing nodes. Failures of the networked system of an organization or even of only a portion of it might cause a significant damage, up to completely shutting down all operations. Additionally, all data of the organization exists somewhere on its networked system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one network node, they are subject to attacks by computer hackers or by hostile adversaries. Quite often the newspapers are reporting incidents in which websites crashed, sensitive data was stolen or service to customers was denied, where the failures were the results of hostile penetration into an organization's networked system.

Thus, many organizations invest a lot of efforts and costs in preventive means designed to protect their networked systems against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a networked system is, is by trying to attack it as a real adversary would. This is known as penetration testing (pen testing, in short), and is a very common approach that is even required by regulation in some developed countries.

Penetration testing requires highly talented people to man the testing team. Those people should be familiar with each and every known security vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). But external consultants are expensive and therefore are typically called in only for brief periods separated by long time intervals in which no such testing is done. This makes the penetration testing ineffective as security vulnerabilities caused by new forms of attacks that appear almost daily are discovered only months after becoming serious threats to the organization.

Additionally, even rich organizations that can afford hiring talented experts for in-house penetration testing teams do not achieve good protection. Testing for security vulnerabilities of a large networked system containing many types of computers, operating systems, network routers and other devices is both a very complex and a very tedious process. The process is prone to human errors of missing testing for certain threats or misinterpreting the damages of certain attacks. Also, because a process of full testing of a large networked system against all threats is quite long, the organization might again end with a too long discovery period after a new threat appears.

Because of the above deficiencies automated penetration testing solutions were introduced in recent years by multiple vendors. These automated solutions reduce human involvement in the penetration testing process, or at least in some of its functions.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of an attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a reporting function may be implemented, for example, by software executing in the same server that implements the functionality of the attack function, where the server reports the findings of the attack function to an administrator or a CISO of the tested networked system.

All penetration testing systems can be characterized as doing either an "actual attack penetration testing" or as doing a "simulated penetration testing".

An actual attack penetration testing system does its penetration testing by attempting to attack the tested networked system. Such a system accesses the tested networked system during the test and is not limiting itself to simulation or evaluation. This includes verifying that the tested networked system can be compromised by actively attempting to compromise it and then checking if it was indeed compromised. This implies that a possible side-effect of executing an actual attack penetration test might be the compromising of the tested networked system.

A simulated penetration testing system does its penetration testing while avoiding disturbance to the tested networked system and specifically while avoiding any risk of compromising it. This implies that whenever there is a need to verify that the tested networked system can be compromised by an operation or a sequence of operations, the verification is done by simulating the results of that operation or sequence of operations or by otherwise evaluating them, without taking the risk of compromising the tested networked system.

Every penetration testing system operates by iteratively (physically or simulatively) compromising network nodes of the tested networked system. At any iteration during the testing process some of the network nodes of the tested networked system are considered to be already compromised by the potential attacker, and the penetration testing system is attempting to compromise an additional network node (not yet compromised) by utilizing the already-compromised network nodes that are operating under the control of the attacker. Once an additional network node is found to be compromisable, it is added to the group of already-compromised network nodes and a new iteration of the testing begins.

As explained above, in every iteration of a penetration testing campaign there is an attempt either to compromise a network node (if the penetration testing system is of the "actual attack" type) or to determine that it is compromisable (if the penetration testing system is of the "simulation/ evaluation" type).

There is, however, a difference between "compromising a network node" and "fully controlling a network node". Similarly, there is a difference between "determining that a network node is compromisable" and "determining that a network node is fully controllable".

A node may be compromised by tempting a user of the node to execute malicious code, as is the case when opening a Microsoft Word file containing a poisoned macro and enabling execution of macros or by tempting the user to select a poisoned link in an email. In such a case the malicious or poisoned code carries out operations determined by the attacker, such as exporting a confidential file out of the network node. However, the user that is to blame for the compromising may be a non-privileged user and not a user having administrator rights for the network node. Consequently, even if the user has access rights to some confidential files, he may not have access rights to other files in the node, such as confidential files owned by other users or confidential files owned by the operating system. Therefore, even though the network node was compromised, the attacker may not be able to fully control it. For example he may not be able to export a given confidential system file (e.g. a passwords file) that is the true goal of the attacker.

Lacking full control of a network node, that node may not be useful for the attacker as a tool for continuing the attack by compromising additional nodes in additional iterations of the penetration testing campaign. For example, having full control of a first node (including an ability to read its passwords file), the attacker could have compromised a second node in the same local sub-network by logging into the second node by mimicking a legitimate user using his user name and password. But lacking full control of the first node, the attacker cannot use such a method for compromising the second node, and therefore may have no way of compromising the second node.

A real attacker that compromises a target network node and achieves less than full control of it, will typically attempt to employ "privilege escalation" techniques. The purpose of such techniques is to "escalate" (i.e. to increase) the current access rights of a user to a higher level, hopefully to the highest level that allows full control of the node. Such techniques are well known in the art and may include retrieving a passwords file for finding user names and then intelligently guessing passwords, dumping of certain system files and then looking for credentials in the dumps, etc. Dumping a system file (e.g., a SAM file, which is a Security Account Manager file containing users' passwords) is a common way to escalate privileges. Often, it is possible to retrieve the LM hashes from a computer that may include an administrator's hash. It can also be possible to use the shadow copy feature of Microsoft Systems to get the "SYS-KEY" and "SAM" files. Another approach used with Unix systems is retrieving the/etc/password file (e.g., when there is a non-chrooted FTP server), enumerating the usernames of the system and trying the usernames as the passwords for the corresponding accounts (relying on the fact that many careless users use their username as a password). Another approach is to investigate the services running in a computer and check which users are running those services. Malicious code injected in one of those processes could retrieve escalated privileges from the process owner. In some embodiments, shared folders can be useful for achieving privilege escalation, because sensitive information may be stored in those shared folders with, at most, few restrictions. Another approach for achieving privilege escalation is to utilize a combination of a DLL preloading vulnerability and having access to a widely used shared folder from which users execute certain applications. In such case, one of the legitimate DLLs can be replaced by a malicious DLL. Additional information on privilege escalation methods can be found in published International Patent Application No. WO 2008/054982, which is incorporated by reference herein in full.

However, there is no guarantee that a given attempt to achieve full control of a given network node by applying privilege escalation techniques will be successful. The result depends on many internal factors of the given network node, such as the type of the Operating System, the version of the Operating System, the strength of passwords used by the users, the encryption method used for protecting critical files, the defensive applications installed in the node, etc.

If the attempt is successful, then the targeted node is now indeed under full control of the attacker and can be used by the attacker for whatever operation that is required for continuing the attack of the networked system, including for attacking another node in the next iteration of the attack. If the attempt is unsuccessful, then the attacker may not be able to continue with his attack plan for the networked system, even though he may still use the resources of the compromised node according to the limited access rights he had achieved in it.

Penetration testing systems that use actual attacks have no difficulty in mimicking the behavior of a real attacker in this respect. When such a penetration testing system succeeds in gaining a foothold in a target network node, it may attempt to achieve privilege escalation exactly as a real attacker does. The system may employ the same techniques available to a true attacker and consequently will achieve the same results. When the attempt to achieve full control of a node fails, the campaign is unable to use to advantage (in the next iterations of the attack) any access right in the targeted node that was not actually achieved. Therefore, the conclusions reached by such penetration testing system regarding the vulnerabilities of the tested networked system will correctly reflect the vulnerabilities available to a real attacker.

But penetration testing systems that use simulation or other types of non-intrusive evaluation are not allowed to find out the ability of an attacker to achieve privilege escalation by actually attempting to achieve it. This creates a difficulty for such systems.

Prior art simulation-based penetration testing systems typically bypass the difficulty by simplifying the simulation in assuming that privilege escalation is always possible. In other words, assuming that once an attacker succeeds in compromising a node (e.g. getting the access rights of one of the authorized users of that node), it is able to eventually get full control of the node (e.g. accessing every file in the node and being able to run any desired code in the node).

Such assumption eliminates the difficulty but results in somewhat inaccurate conclusions from the testing. In the real world some nodes may not be fully controllable after being compromised to some extent. Therefore, a penetration testing campaign relying on the above simplifying assumption may incorrectly conclude that a given networked system is highly vulnerable to attacks, while in reality only some low-importance resources and assets can be compromised by an attacker.

Therefore, it is desirable to have penetration testing systems that, while being of the simulation/evaluation type, are still able to provide accurate conclusions about tested networked systems.

SUMMARY OF THE INVENTION

A method is disclosed, according to embodiments of the present invention, for carrying out a penetration testing campaign of a networked system by a simulated penetration testing system, for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node. The method comprises: (a) selecting a first target network node of the plurality of network nodes of the networked system; and (b) handling the first target network node, the handling of the first target network node comprising: (i) based on the selected first target network node and based on the current assignment of the plurality of network nodes to the blue, red and purple classes, determining a first vulnerability that can compromise the first target network node; (ii) checking whether compromising the first target network node using the first vulnerability would result in the attacker achieving full control of the first target network node; and (iii) in response to determining that the compromising of the first target network node using the first vulnerability would result in the attacker achieving full control of the first target network node, assigning the first target network node to the red class. The method additionally comprises: (c) selecting a second target network node of the plurality of network nodes of the networked system; and (d) handling the second target network node, the handling of the second target network node comprising: (i) based on the selected second target network node and based on the current assignment of the plurality of network nodes to the blue, red and purple classes, determining a second vulnerability that can compromise the second target network node; (ii) checking whether compromising the second target network node using the second vulnerability would result in the attacker achieving full control of the second target network node; and (iii) in response to determining that (i) the compromising of the second target network node using the second vulnerability would not result in the attacker achieving full control of the second target network node and (ii) the attacker would be able to achieve full control of the second target network node by using (A) one or more privilege escalation techniques and (B) one or more access rights to the second target network node obtained by the compromising of the second target network node using the second vulnerability, assigning the second target network node to the red class. The method additionally comprises: (e) selecting a third target network node of the plurality of network nodes of the networked system; and (f) handling the third target network node, the handling of the third target network node comprising: (i) based on the selected third target network node and based on the current assignment of the plurality of network nodes to the blue, red and purple classes, determining a third vulnerability that can compromise the third target network node; (ii) checking whether compromising the third target network node using the third vulnerability would result in the attacker achieving full control of the third target network node; and (iii) in response to determining that (i) the compromising of the third target network node using the third vulnerability would not result in the attacker achieving full control of the third target network node and (ii) the attacker cannot achieve full control of the third target network node by using (A) any combination of privilege escalation techniques and (B) any combination of access rights to the third target network node obtained by the compromising of the third target network node using the third vulnerability, assigning the third target network node to the purple class. The method additionally comprises: (g) based on at least one of the first vulnerability, the second vulnerability and the third vulnerability, determining the way for an attacker to compromise the networked system; and (h) reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the assigning of the third target network node to the purple class can comprise associating with the third target network node all access rights that would be available to the attacker after using the third vulnerability to compromise the third target network node. In some such claims, the selecting of the first target network node can be based on at least one access right associated with a network node currently assigned to the purple class. In some such claims, the determining of the first vulnerability can be further based on at least one access right associated with a network node currently assigned to the purple class.

In some embodiments, the first target network node can be selected from the network nodes assigned to the blue class.

In some embodiments, the first target network node cam be selected from the network nodes assigned to the blue class or the purple class.

In some embodiments, it can be that (i) a reconnaissance agent software module is installed on at least some network nodes of the plurality of network nodes, and (ii) the determining of the first vulnerability that can compromise the first target network node is based on data received from the reconnaissance agent software module installed on the first target network node.

A simulated penetration testing system is disclosed, according to embodiments of the present invention, for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node. The simulated penetration testing system comprises: (a) a computing device comprising one or more processors, the computing device in networked communication with multiple network nodes of the networked system; and (b) a non-transitory computer-readable storage medium containing program instructions, wherein execution of the program instructions by the one or more processors of the computing device causes the one or more processors of the computing device to carry out the following steps: (i) selecting a first target network node of the plurality of network nodes of the networked system; (ii) handling the first target network node, the handling of the first target network node comprising: (A) based on the selected first target network node and based on the current assignment of the plurality of network nodes to the blue, red and purple classes, determining a first vulnerability that can compromise the first target network node; (B) checking whether compromising the first target network node using the first vulnerability would result in the attacker achieving full control of the first target network node; and (C) in response to determining that the compromising of the first target network node using the first vulnerability would result in the attacker achieving full control of the first target network node, assigning the first target network node to the red class; (iii) selecting a second target network node of the plurality of network nodes of the networked system; (iv) handling the second target network node, the handling of the second target network node comprising: (A) based on the selected second target network node and based on the current assignment of the plurality of network nodes to the blue, red and purple classes, determining a second vulnerability that can compromise the second target network node; (B) checking whether compromising the second target network node using the second vulnerability would result in the attacker achieving full control of the second target network node; and (C) in response to determining that (I) the compromising of the second target network node using the second vulnerability would not result in the attacker achieving full control of the second target network node and (II) the attacker would be able to achieve full control of the second target network node by using (1) one or more privilege escalation techniques and (2) one or more access rights to the second target network node obtained by the compromising of the second target network node using the second vulnerability, assigning the second target network node to the red class; (v) selecting a third target network node of the plurality of network nodes of the networked system; (vi) handling the third target network node, the handling of the third target network node comprising: (A) based on the selected third target network node and based on the current assignment of the plurality of network nodes to the blue, red and purple classes, determining a third vulnerability that can compromise the third target network node; (B) checking whether compromising the third target network node using the third vulnerability would result in the attacker achieving full control of the third target network node; and (C) in response to determining that (I) the compromising of the third target network node using the third vulnerability would not result in the attacker achieving full control of the third target network node and (II) the attacker cannot achieve full control of the third target network node by using (1) any combination of privilege escalation techniques and (2) any combination of access rights to the third target network node obtained by the compromising of the third target network node using the third vulnerability, assigning the third target network node to the purple class; (vii) based on at least one of the first vulnerability, the second vulnerability and the third vulnerability, determining the way for an attacker to compromise the networked system; and (viii) reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the assigning of the third target network node to the purple class can comprise associating with the third target network node all access rights that would be available to the attacker after using the third vulnerability to compromise the third target network node. In some such embodiments, the selecting of the first target network node can be based on at least one access right associated with a network node currently assigned to the purple class. In some such embodiments, the determining of the first vulnerability can be further based on at least one access right associated with a network node currently assigned to the purple class.

In some embodiments, the first target network node can be selected from the network nodes assigned to the blue class.

In some embodiments, the first target network node can be selected from the network nodes assigned to the blue class or the purple class.

In some embodiments, the simulated penetration testing system can additionally comprise: (c) a reconnaissance agent software module installed on at least some network nodes of the plurality of network nodes, and it can be that the determining of the first vulnerability that can compromise the first target network node is based on data received from the reconnaissance agent software module installed on the first target network node.

A method is disclosed, according to embodiments of the present invention, for carrying out a penetration testing campaign of a networked system by a simulated penetration testing system, for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node. The method comprises: (a) selecting a first target network node of the plurality of network nodes of the networked system; and (b) handling the first target network node, the handling of the first target network node comprising: (i) based on the selected first target network node and based on the current assignment of the plurality of network nodes to the blue, red and purple classes, determining a first vulnerability that can compromise the first target network node; (ii) checking whether compromising the first target network node using the first vulnerability would result in the attacker achieving full control of the first target network node; and (iii) in response to determining that the compromising of the first target network node using the first vulnerability would result in the attacker achieving full control of the first target network node, assigning the first target network node to the red class. The method additionally comprises: (c) selecting a second target network node of the plurality of network nodes of the networked system; and (d) handling the second target network node, the handling of the second target network node comprising: (i) based on the selected second target network node and based on the current assignment of the plurality of network nodes to the blue, red and purple classes, determining a second vulnerability that can compromise the second target network node; (ii) checking whether compromising the second target network node using the second vulnerability would result in the attacker achieving full control of the second target network node; and (iii) in response to determining that the compromising of the second target network node using the second vulnerability would not result in the attacker achieving full control of the second target network node, assigning the second target network node to the purple class. The method additionally comprises: (e) based on at least one of the first vulnerability and the second vulnerability, determining the way for an attacker to compromise the networked system; and (f) reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the assigning of the second target network node to the purple class can comprise associating with the second target network node all access rights that would be available to the attacker after using the second vulnerability to compromise the second target network node. In some such embodiments, the selecting of the first target network node can be based on at least one access right associated with a network node currently assigned to the purple class. In some such embodiments, the determining of the first vulnerability can be further based on at least one access right associated with a network node currently assigned to the purple class.

In some embodiments, the first target network node can be selected from the network nodes assigned to the blue class.

In some embodiments, the first target network node can be selected from the network nodes assigned to the blue class or the purple class.

In some embodiments, it can be that (i) a reconnaissance agent software module is installed on at least some network nodes of the plurality of network nodes, and (ii) the determining of the first vulnerability that can compromise the first target network node is based on data received from the reconnaissance agent software module installed on the first target network node.

A simulated penetration testing system is disclosed, according to embodiments of the present invention, for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node. The penetration testing system comprises: (a) a computing device comprising one or more processors, the computing device in networked communication with multiple network nodes of the networked system; and (b) a non-transitory computer-readable storage medium containing program instructions, wherein execution of the program instructions by the one or more processors of the computing device causes the one or more processors of the computing device to carry out the following steps: (i) selecting a first target network node of the plurality of network nodes of the networked system; (ii) handling the first target network node, the handling of the first target network node comprising: (A) based on the selected first target network node and based on the current assignment of the plurality of network nodes to the blue, red and purple classes, determining a first vulnerability that can compromise the first target network node; (B) checking whether compromising the first target network node using the first vulnerability would result in the attacker achieving full control of the first target network node; and (C) in response to determining that the compromising of the first target network node using the first vulnerability would result in the attacker achieving full control of the first target network node, assigning the first target network node to the red class; (iii) selecting a second target network node of the plurality of network nodes of the networked system; and (iv) handling the second target network node, the handling of the second target network node comprising: (A) based on the selected second target network node and based on the current assignment of the plurality of network nodes to the blue, red and purple classes, determining a second vulnerability that can compromise the second target network node; (B) checking whether compromising the second target network node using the second vulnerability would result in the attacker achieving full control of the second target network node; and (C) in response to determining that the compromising of the second target network node using the second vulnerability would not result in the attacker achieving full control of the second target network node, assigning the second target network node to the purple class; (v) based on at least one of the first vulnerability and the second vulnerability, determining the way for an attacker to compromise the networked system; and (vi) reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the assigning of the second target network node to the purple class can comprise associating with the second target network node all access rights that would be available to the attacker after using the second vulnerability to compromise the second target network node. In some such embodiments, the selecting of the first target network node can be based on at least one access right associated with a network node currently assigned to the purple class. In some such embodiments, the determining of the first vulnerability can be further based on at least one access right associated with a network node currently assigned to the purple class.

In some embodiments, the first target network node can be selected from the network nodes assigned to the blue class.

In some embodiments, the first target network node can be selected from the network nodes assigned to the blue class or the purple class.

In some embodiments, the simulated penetration testing system can additionally comprise: (c) a reconnaissance agent software module installed on at least some network nodes of the plurality of network nodes, and it can be that the determining of the first vulnerability that can compromise the first target network node is based on data received from the reconnaissance agent software module installed on the first target network node.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 1 is a timeline of a penetration testing campaign, showing a number of assigned node classifications at selected stages of the campaign, according to embodiments of the present invention.

FIGS. 11, 12A and 12B show flowcharts of methods of carrying out a penetration testing campaign of a networked system by a penetration testing system, according to embodiments of the present invention.

DETAILED DESCRIPTION OF THE EMBODIMENTS

Figure 2:
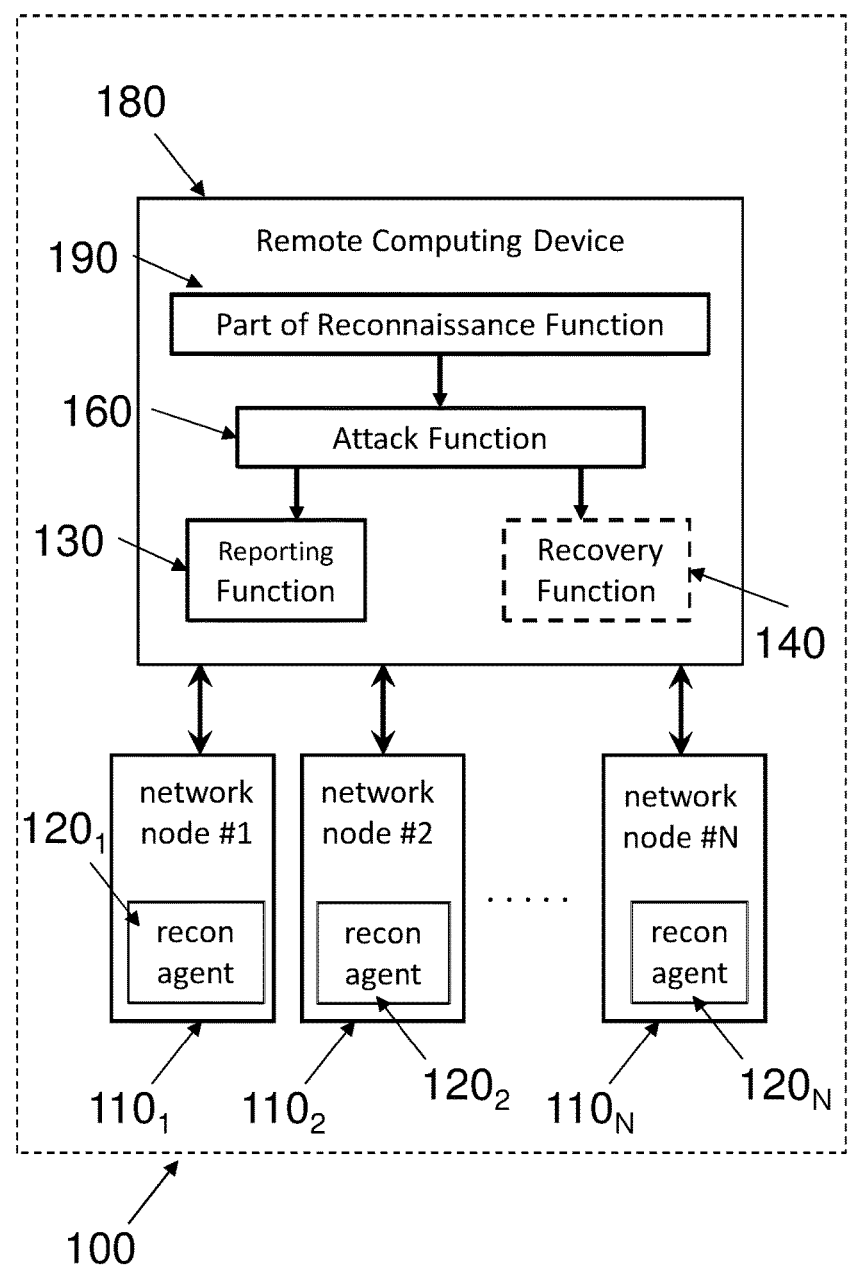
FIG. 2 is a functional block diagram of a reconnaissance agent penetration testing system which may employ embodiments of the present invention.

Note: Throughout this disclosure, subscripted reference numbers (e.g., $10_1$) or letter-modified reference numbers (e.g., $100a$) may be used to designate multiple separate appearances of elements in a single drawing, e.g. $10_1$ is a single appearance (out of a plurality of appearances) of element 10, and likewise $100a$ is a single appearance (out of a plurality of appearances) of element 100.

According to embodiments, a simulation-type penetration testing system is disclosed that eschews the clear-cut binary distinction—common to prior-art penetration testing systems—between nodes that are already known to be compromisable (sometimes referred to as "red nodes" that are in a "red state") and nodes that are not known, at a given or 'current' stage of a penetration testing campaign, to be compromisable (sometimes referred to as "blue nodes" that are in a "blue state"). A new node state is added herein as a third classification along with the red state and the blue state. As it is an intermediate state between the red and blue states, we may call it a "purple state" and a node being in such state may be called a "purple node".

A purple node is a node which, at the current stage of the campaign, is known to be partially compromisable, but is not known to be fully controllable by the attacker. In other words, it is known that an attacker can penetrate into the node, gain some access rights to some of its resources and/or gain some control over some of its assets. However, at the current stage of the campaign, it is not known whether the attacker can achieve full control of the node.

According to this realignment of node classes, a red node is one that not only is known to be compromisable by the attacker—but is known to be compromisable in a way that gives the attacker full control of the node. Full control, as discussed earlier, can include unlimited access to files on the node, including password files. Blue nodes retain the definition as nodes that are not known (at the given or 'current' stage of the campaign) to be compromisable.

The term "current stage of the campaign" (or, equivalently, "current state of the campaign") as used in this disclosure can be better understood with reference to the non-limiting example illustrated in FIG. 1. A timeline of an exemplary penetration testing campaign having a given duration is shown. The duration is from the point marked 'start' to the point marked 'end'. The timeline also shows three stages of the campaign $S_X$, $S_Y$ and $S_Z$ shown only as illustrative examples—obviously, there can be any number of stages in a campaign. Any one of the marked stages of the campaign $S_X$, $S_Y$ and $S_Z$ can correspond, in various embodiments, to a point in time during the campaign, to a stage at which a number of campaign steps or campaign iterations has been carried out up to that point or at which a number of network nodes has been analyzed up to that point, or to any other logical division of the campaign. For example, if the campaign is scheduled to last two hours, $S_X$ might correspond to the 30-minute mark of the campaign. As another example, if the campaign is scheduled to determine the compromisability of 200 network nodes, $S_X$ might correspond to the $50^{th}$ network node targeted during the campaign.

In FIG. 1, the respective classifications of five illustrative nodes $110_A \ldots 110_E$, are shown at the various stages of the campaign. At the 'start' of the campaign, it can be said that at the 'current' stage of the campaign, four of the five nodes are 'blue' nodes, meaning that it is not yet known whether the nodes are compromisable, and Node $110_E$ is already classified as a 'purple node'—known to be compromisable but not known to be fully controllable by an attacker. This pre-classification of a network node as purple (or even red) can be on the basis of prior knowledge, for example from a previous penetration testing campaign.

At stage $S_X$, a 'snapshot' of the five illustrated nodes shows the respective node classifications (or assignments) as purple, blue, blue, blue and purple, respectively, i.e., according to the 'current stage' (or 'current state') of the campaign.

In the present example, Node $110_A$ can be a node for which an ongoing penetration testing campaign has determined, early in the campaign or at least before reaching stage $S_X$, that an attacker is able to log into Node $110_A$ as a non-privileged user. However, it has not been determined at this stage whether the attacker can log into Node $110_A$ as an administrator. Thus at the current state of the campaign at point $S_X$, Node $110_A$ is a purple node—but not a red node, as the attacker is currently unable to access certain high-privilege system files or execute malicious code in kernel mode. Node $110_C$ at stage $S_Y$ is another example of a formerly blue node being assigned to the purple class of nodes.

In contrast, a node for which the penetration testing campaign had determined that an attacker is able to log into it as an administrator is a red node, as the attacker can achieve full control of it. An example of such a node in FIG. 1 is Node $110_B$, which in the interval between points $S_X$ and $S_Y$ is found to be compromisable by an attacker to the extent of the attacker achieving full control—and thus is assigned to the red class of nodes.

Returning to the example of Node $110_A$, at the current state of the campaign as of stage $S_X$, Node $110_A$ is now a purple node. In some embodiments, penetration testing campaigns use a lateral movement strategy that does not involve revisiting the handling or checking of individual nodes. In such embodiments, Node $110_A$ would remain in the purple class until the end of the penetration testing campaign. In some embodiments, a penetration testing system may return to a node that has been already assigned to the purple class, in order to check whether it is now possible to achieve full control over the previously-handled node and to push it into the class of red nodes. This can be the case of Node $110_A$ of FIG. 1, which 'progresses' at various stages of the penetration testing campaign from blue to purple to red. For example, after achieving full control of a second network node (or, in the case of a 'simulation' penetration testing system, after determining that an attacker can compromise a second network node and achieve full control of it), it may be possible to use access rights or passwords obtained by controlling the second node to return to a purple node and now achieve full control of it. Other examples of re-addressing purple nodes and converting them to red nodes are discussed hereinbelow.

In the FIG. 1 example, the other network nodes display the following results: Node $110_B$ is a blue node when the campaign starts, and somewhere between $S_X$ and $S_Y$ is assigned to the red class. Node $110_C$ is a blue node when the campaign starts, and somewhere between $S_X$ and $S_Y$ is assigned to the purple class. Node $110_D$ is a blue node when the campaign starts and remains blue until the end—either it is not found to be compromisable by the penetration testing system in spite of trying, or it is not tested during the current campaign, perhaps because it was assigned a low priority for testing in comparison with other nodes or because it wasn't easily accessible from nodes targeted in the campaign, or because the campaign was of limited duration. It should be understood that blue nodes 'not known to be compromisable' at any given current state of the campaign can include nodes that are not yet tested, as well as nodes that are tested and not found to be compromisable Finally, Node $110_E$ is a purple node when the campaign starts, and during the campaign, somewhere between points $S_Y$ and $S_Z$, is assigned to the red class.

Example 1

During a penetration testing campaign carried out according to embodiments of the present invention, a specific iteration may include the following:

A. Based on the current collection of red and purple nodes, selecting the next target node to be checked for compromisability. The selection of the target node is done from the current group of blue nodes and according to the lateral movement strategy employed by the campaign.

B. Based on the selected target network node, selecting a potential vulnerability that may compromise the selected target network node. The vulnerability is selected from the vulnerabilities known to be potentially effective in compromising a network node with one or more characteristics known to be present in the selected target network node.

C. Attempting to validate that the selected target network node could be successfully compromised using the selected potential vulnerability. The attempt is typically based on data about the current conditions in the selected target network node (e.g. whether a given Internet port, through which the selected potential vulnerability may penetrate a victim network node, is currently open in the selected target network node).

D. In response to determining that the selected target node can be compromised by some attack method, checking whether the attack method by which the selected target node could be compromised gives the attacker full control or partial control of the selected target network node.

E. If the attack method by which the selected target node could be compromised gives the attacker full control, declare the selected target node to be a red node, and loop back to step A for starting the next iteration of the campaign.

F. Else (i.e. the attack method by which the selected target node could be compromised gives the attacker only partial control of the selected target network node), check whether an attacker having such partial control is able to use privilege escalation techniques for obtaining full control of the selected target node. The checking is typically based on data about the current conditions in the selected target network node (e.g. whether there is a shared folder that provides an opportunity for achieving privilege escalation).

G. In response to determining that the attacker can successfully use privilege escalation techniques for obtaining full control, declare the selected target node to be a red node, and loop back to step A for starting the next iteration of the campaign.

H. Else (i.e. the attacker cannot obtain full control), declare the selected target node to be a purple node. Keep a list of access rights available to the attacker in the selected target node after compromising that node, and then loop back to step A for starting the next iteration of the campaign.

In steps A, B and C as performed in Example 1, each one of the selection of the next target node, the selection of the potential vulnerability and the validating of successful compromising, may be done based on, among other things, the access rights associated with one or more of the current purple nodes. For example, if there exists a purple node for which the associated list of access rights (stored in step H of a previous iteration) does not enable reading the password file, then a neighboring node in the same local sub-network of the networked system cannot be compromised by logging into it as a legitimate user (assuming the passwords file for the sub-network resides only in that purple node). As another example, if there exists a purple node for which the associated list of access rights includes the right to write into a folder shared with a given blue node that is known to periodically execute a given executable file from the shared folder, then that blue node can be compromised by using the purple node for poisoning the given executable file in the shared folder.

The list of access rights associated with a purple node does not necessarily have to be kept as a list. It may be kept as any type of data structure known in the art, including, without limitation, one or multiple tables, linked lists, binary trees, etc.

Example 2

During a penetration testing campaign carried out according to embodiments of the present invention, a specific iteration may include the following:

A. Based on the current collection of red and purple nodes, selecting the next target node to be checked for compromisability. The selection of the target node is done from the union of the current group of purple nodes and the current group of blue nodes. In the current example we assume the selected target node happens to be a purple node.

B. Based on the selected target network node, selecting a potential vulnerability that may compromise the selected target network node. The vulnerability is selected from the vulnerabilities known to be potentially effective in compromising a network node with one or more characteristics known to be present in the selected target network node. Note that the newly selected vulnerability for compromising a selected target node which is already a purple node is different from a previous vulnerability that caused that node to become purple in the first place. The finding of the new vulnerability may be based on additional nodes becoming red/purple after declaring the selected purple node to be purple. The additional red/purple nodes may provide new ways for attacking the selected purple node, that were not previously available.

C. Attempting to validate that the selected target network node could be successfully compromised using the new selected potential vulnerability. The attempt is typically based on data about the current conditions in the selected target network node.

D. In response to determining that the selected target node can be compromised by some new attack method, checking whether the new attack method by which the selected target node could be compromised gives the attacker full control of the selected target network node. As the newly selected vulnerability may be based on additional nodes becoming red/purple after declaring the selected purple node to be purple, the additional red/purple nodes may provide new ways for attacking the selected purple node, and if such new ways of attack provide stronger access rights to the attacker than the attack method that made the node purple, then the previously purple node may now be determined to become fully controllable by the attacker. This explains why a node may be made purple in a first iteration and then made red in a later iteration.

E. If the new attack method by which the selected target node could be compromised gives the attacker full control, declare the selected target node to be a red node, and loop back to step A for starting the next iteration of the campaign.

F. Else (i.e. if the new attack method using the second vulnerability still gives the attacker only partial control of the selected target network node), check whether an attacker having such partial control is able to use privilege escalation techniques for obtaining full control of the selected target node. The checking is typically based on data about the current conditions in the selected target network node.

G. In response to determining that the attacker can successfully use privilege escalation techniques for obtaining full control, declare the selected target node to be a red node, and loop back to step A for starting the next iteration of the campaign.

H. Else (i.e. the attacker cannot obtain full control), the selected target node remains a purple node. Add the newly obtained access rights to the list of access rights available to the attacker in the selected target node after compromising that node, and then loop back to step A for starting the next iteration of the campaign.

As can be understood from the foregoing examples, in some embodiments (e.g., as illustrated by Example 1) the selection of the next target node is limited to be from the group of blue nodes and once a node was declared to be purple, it remains purple until the end of the campaign. In some embodiments (e.g., as illustrated by Example 2), a purple node may also be selected to be the next target node, and consequently may then become a red node.

The proposed solution can work for any type of simulation/evaluation-based penetration testing system but is especially useful for reconnaissance agent penetration testing systems. Such systems are disclosed, for example, in U.S. Pat. No. 10,038,711 (which is incorporated by reference herein in full) and include an agent software module that is installed in each of multiple network nodes of the tested networked system in order to collect data from the hosting nodes and report it to the central server of the penetration testing system. The availability of such reconnaissance agent in a network node that is being evaluated before becoming purple or red makes it simpler to find out information that decides the question. This is so because the question of whether privilege escalation techniques can be successfully applied to a node may be highly dependent on multiple facts about that node, possibly including internal facts of that node that are not visible outside the node.

Referring now to the figures, and in particular to FIG. 2, a functional block diagram of a penetration testing system 100 is shown according to some embodiments, comprising a reconnaissance function as defined as definition "14" in the Definitions Section later in this specification. The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 180 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 180. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 180, or, alternatively, the functionality of the remote computing device 180 of FIG. 2 is split between the physically-remote remote computing device 180 and the network nodes 110.

A reconnaissance agent, or a reconnaissance client agent, which is synonymous therewith, is a software module designed to be installed in nodes of the tested networked system. A reconnaissance client agent is able to communicate with a remote computing device hosting a penetration testing software module responsible, among other things, for managing and conducting the penetration testing process. A reconnaissance client agent can report, to the penetration testing software module when installed on the remote computing device, data extracted by the agent from its hosting node.

Figure 3:
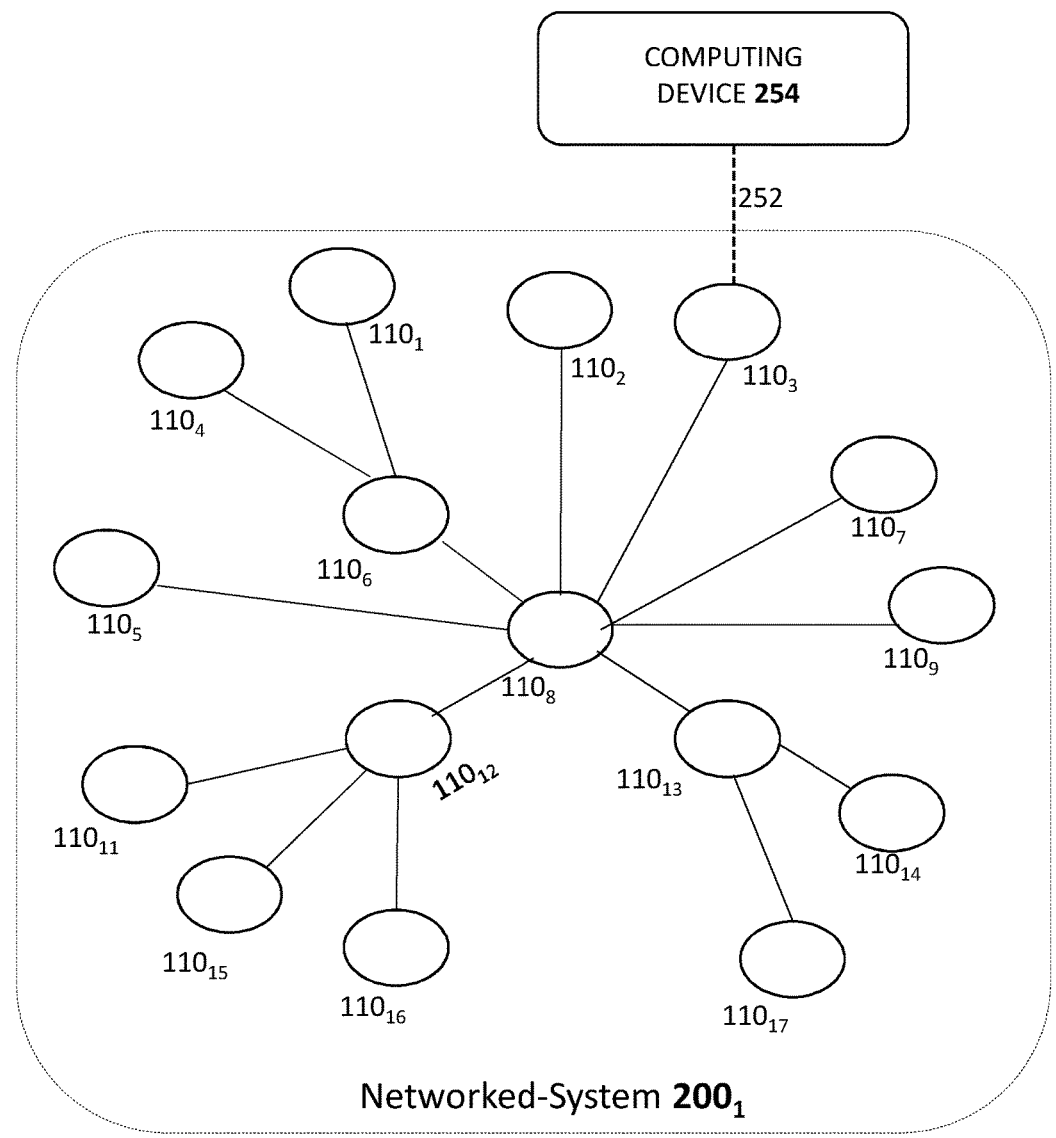
FIGS. 3 and 4 show schematic illustrations of networked systems that may be tested according to embodiments of the present invention and their connection to a penetration testing system.

Referring now to FIG. 3, a remote computing device 254 of a penetration testing system 100 is in communication (via communications link 252) with a plurality of networked nodes 110 of networked system $200_1$. Communications link 252 can include any combination of wired and wireless technologies; in some embodiments link 252 can be an Internet connection and remote computing device 254 can be a general-purpose computer server located at a data center or shared server location, for example 'in the cloud.' The number of network nodes 110 can be as few as two and as many as several hundred or several thousand. They can be connected hierarchically, peer-to-peer, hub-and-spoke, or in any combination of connections as long as each networked node 110 is connected to at least one other node 110. The seemingly direct connection of remote computer 254 with Node $110_3$ shown in FIG. 3 is for convenient illustration purposes only, and any communications link described herein can be made, as is known in the art, with one or more network nodes, with a router or gateway, in any other networking configuration that facilitates direct or indirect communication with each of the respective nodes 110 in networked system $200_1$. The physical location of remote computing device 254 is unimportant. It can be, by way of non-limiting examples, at a physical location belonging to a supplier or operator of a penetration testing system, in a 'cloud' server farm of an Internet services or cloud services provider, or it can be physically co-located with some or all of the network nodes 110.

Figure 4:
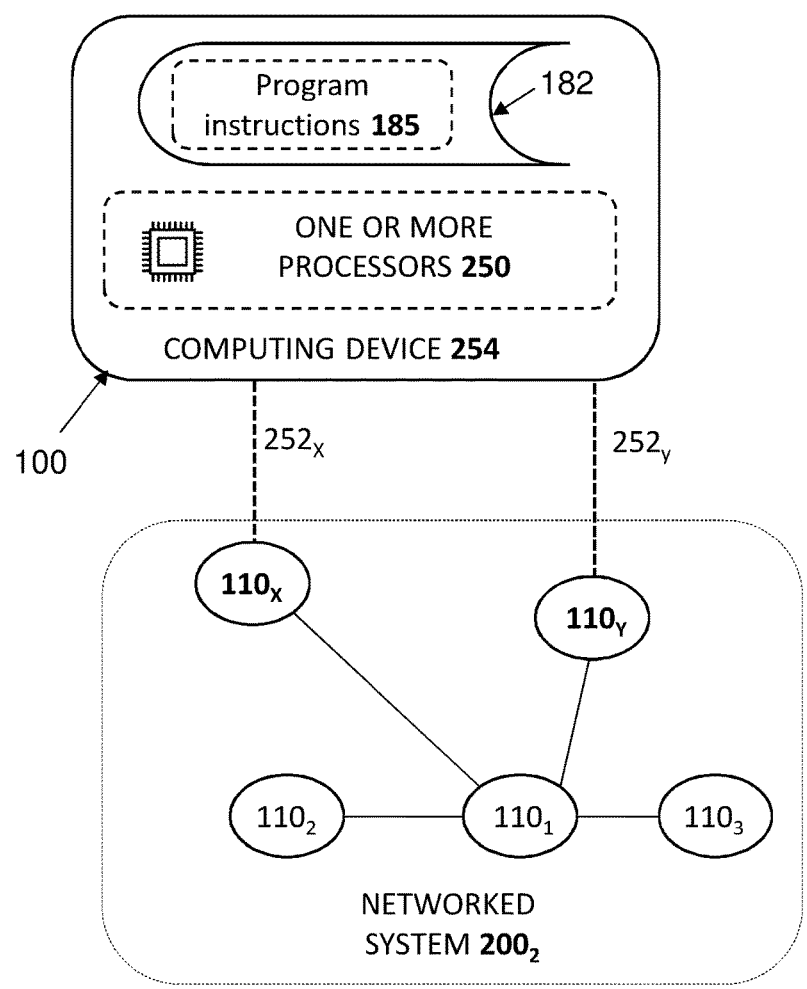
Figure 5A:
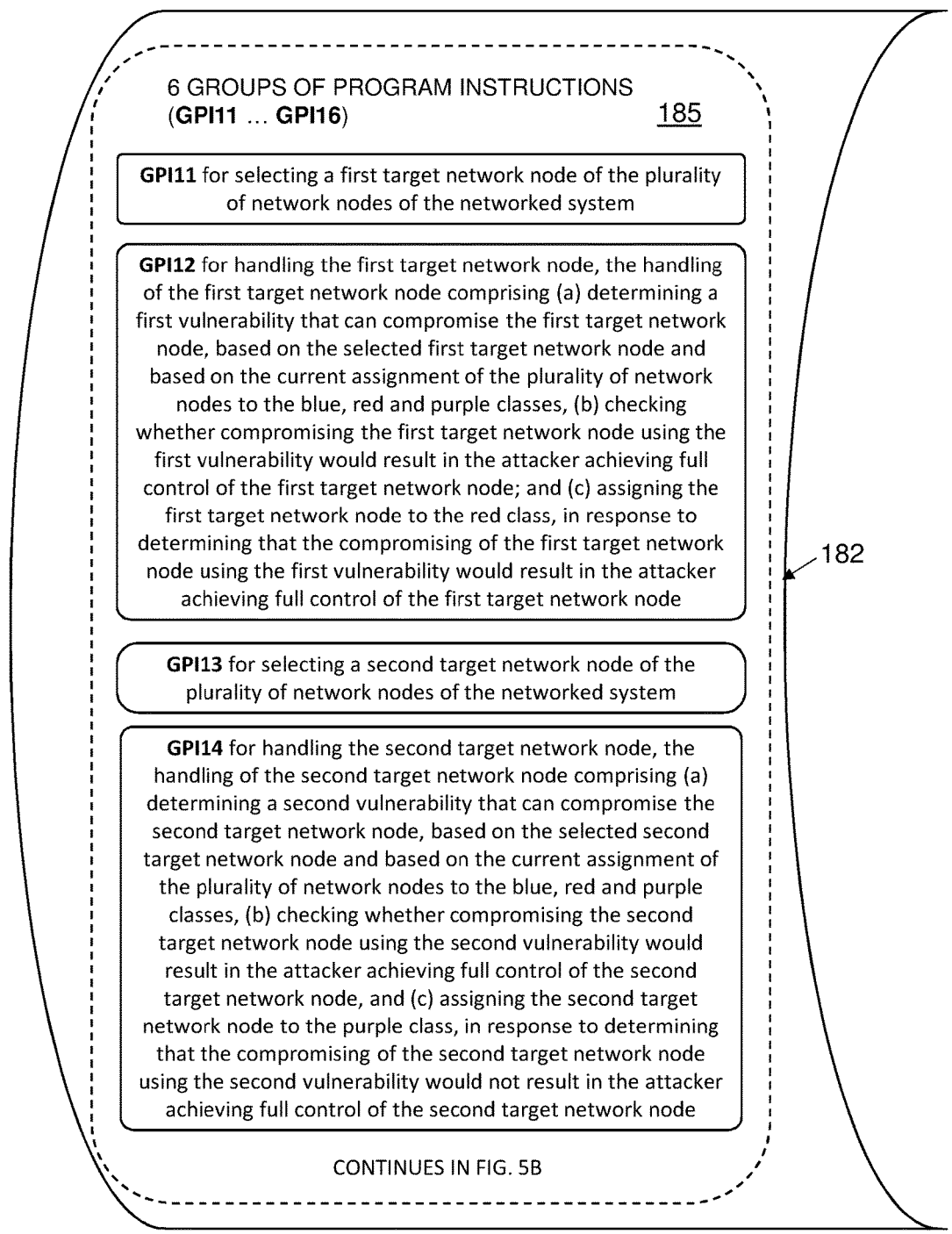
FIGS. 5A and 5B together show a block diagram of a non-transitory computer-readable storage medium comprising respective program instructions, according to embodiments of the present invention.
Figure 5B:
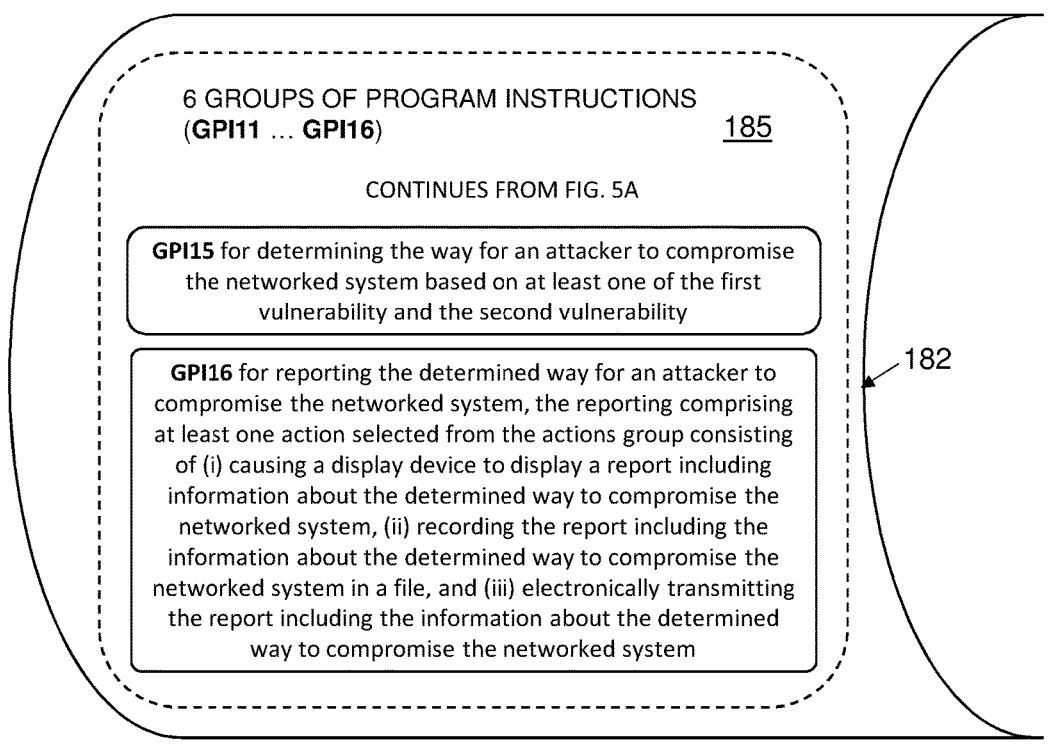

Components of a penetration testing system 100 according to some embodiments are illustrated in FIGS. 4, 5A and 5B. The penetration testing system 100 itself comprises computing device 254, which comprises one or more processors 250, and non-transitory computer-readable storage medium 182. The storage medium 182 is shown for convenience as being part of the remote computing device 254 but it can be anywhere as long as the one or more processors 250 can access and execute the program instructions 185 stored therein. First network node $110_X$ is in electronic communication with computing device 254 (by communications arrangement $252_X$ which can be an Internet connection or a LAN connection or any other suitable connection, including an indirect connection). Second network node $110_Y$ is also in electronic communication with computing device 254 (by communications arrangement $252_Y$ which can be the same as communications arrangement $252_X$ or separate and/or different).

As illustrated in the block diagram of FIGS. 5A and 5B, storage medium 182 includes program instructions 185, which include 6 groups of program instructions GPI1 . . . GPI6. Execution of the program instructions 185 by the one or more processors 250 of the computing device 254 causes the one or more processors 250 of the computing device 254 to execute the following groups of program instructions:

GPI1 for selecting a first target network node of the plurality of network nodes of the networked system;

GPI2 for handling the first target network node, the handling of the first target network node comprising (a) determining a first vulnerability that can compromise the first target network node, based on the selected first target network node and based on the current assignment of the plurality of network nodes to the blue, red and purple classes, (b) checking whether compromising the first target network node using the first vulnerability would result in the attacker achieving full control of the first target network node; and (c) assigning the first target network node to the red class, in response to determining that the compromising of the first target network node using the first vulnerability would result in the attacker achieving full control of the first target network node;

GPI3 for selecting a second target network node of the plurality of network nodes of the networked system;

GPI4 for handling the second target network node, the handling of the second target network node comprising (a) determining a second vulnerability that can compromise the second target network node, based on the selected second target network node and based on the current assignment of the plurality of network nodes to the blue, red and purple classes, (b) checking whether compromising the second target network node using the second vulnerability would result in the attacker achieving full control of the second target network node, and (c) assigning the second target network node to the purple class, in response to determining that the compromising of the second target network node using the second vulnerability would not result in the attacker achieving full control of the second target network node;

GPI15 for determining the way for an attacker to compromise the networked system based on at least one of the first vulnerability and the second vulnerability; and GPI16 for reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

Figure 6:
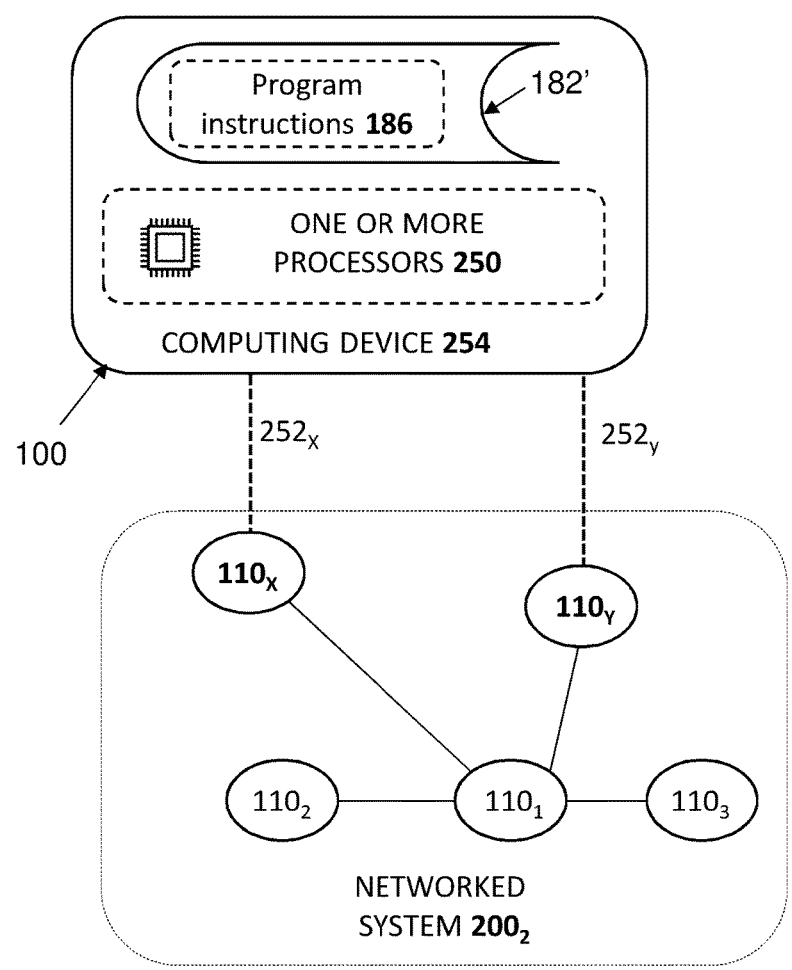
FIG. 6 shows a schematic illustration of a networked system that may be tested according to embodiments of the present invention.
Figure 7A:
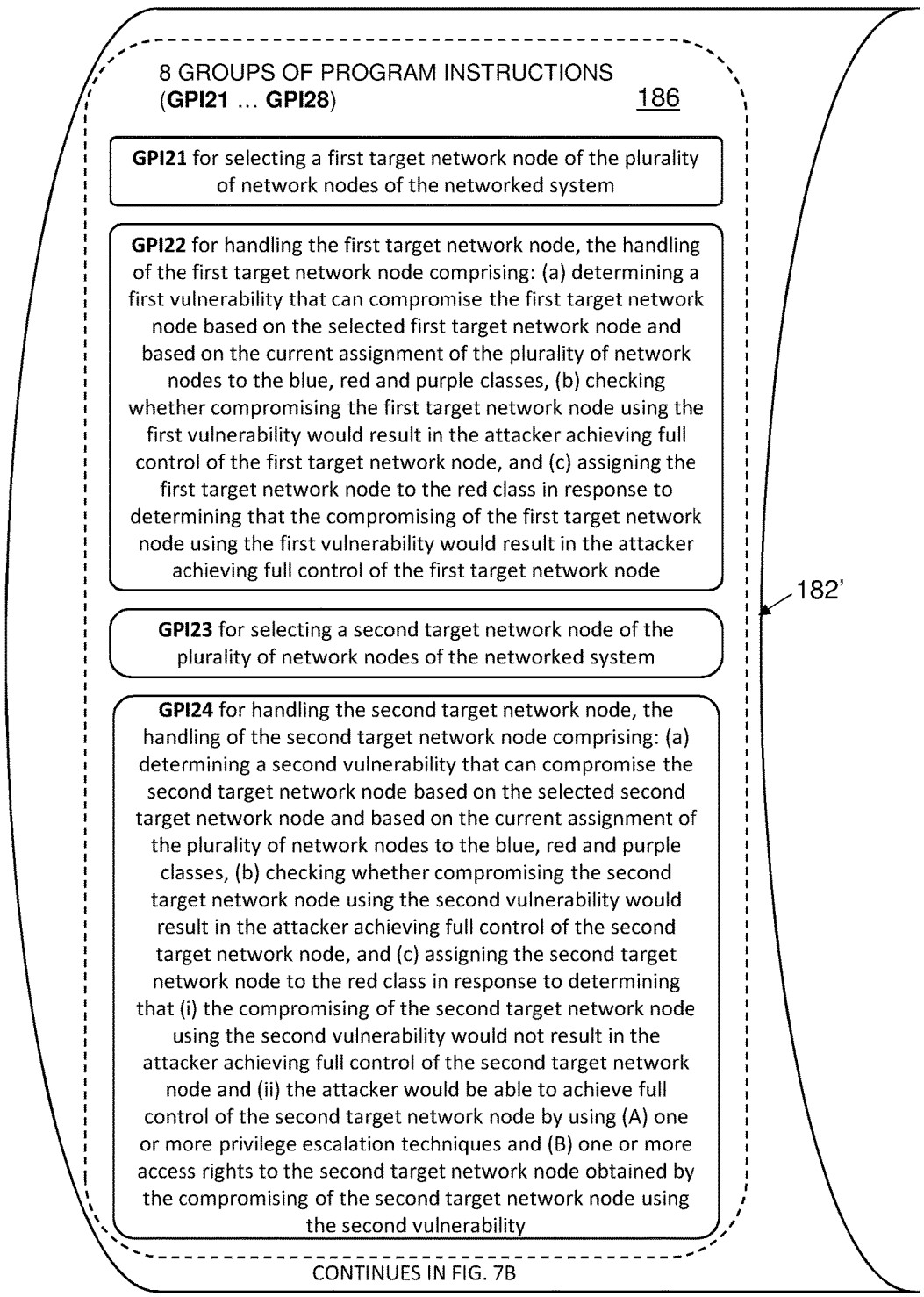
FIGS. 7A and 7B together show a block diagram of a non-transitory computer-readable storage medium comprising respective program instructions, according to embodiments of the present invention.
Figure 7B:
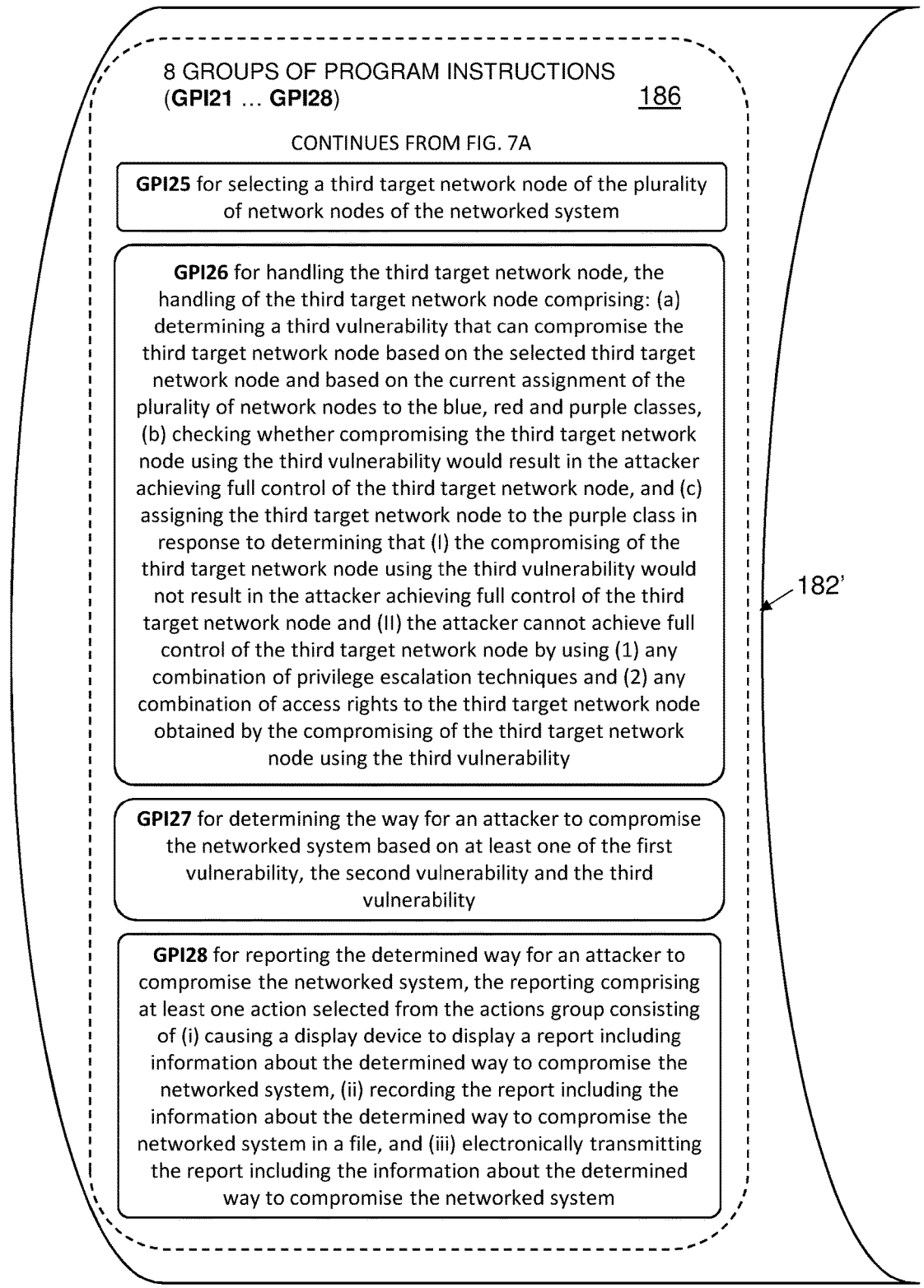

In some embodiments, the penetration testing system 100 comprises storage medium 182' which includes program instructions 186, as illustrated in FIGS. 6, 7A and 7B. The storage medium 182' is shown for convenience as being part of the remote computing device 254 but it can be anywhere as long as the one or more processors 250 can access and execute the program instructions 186 stored therein.

As illustrated in the block diagram of FIGS. 7A and 7B, storage medium 182' includes program instructions 186, which include 8 groups of program instructions GPI21 . . . GPI28. Execution of the program instructions 186 by the one or more processors 250 of the computing device 254 causes the one or more processors 250 of the computing device 254 to execute the following groups of program instructions:

GPI21 for selecting a first target network node of the plurality of network nodes of the networked system;

GPI22 for handling the first target network node, the handling of the first target network node comprising: (a) determining a first vulnerability that can compromise the first target network node, based on the selected first target network node and based on the current assignment of the plurality of network nodes to the blue, red and purple classes, (b) checking whether compromising the first target network node using the first vulnerability would result in the attacker achieving full control of the first target network node, and (c) assigning the first target network node to the red class in response to determining that the compromising of the first target network node using the first vulnerability would result in the attacker achieving full control of the first target network node;

GPI23 for selecting a second target network node of the plurality of network nodes of the networked system;

GPI24 for handling the second target network node, the handling of the second target network node comprising: (a) determining a second vulnerability that can compromise the second target network node, based on the selected second target network node and based on the current assignment of the plurality of network nodes to the blue, red and purple classes, (b) checking whether compromising the second target network node using the second vulnerability would result in the attacker achieving full control of the second target network node, and (c) assigning the second target network node to the red class in response to determining that (i) the compromising of the second target network node using the second vulnerability would not result in the attacker achieving full control of the second target network node and (ii) the attacker would be able to achieve full control of the second target network node by using (A) one or more privilege escalation techniques and (B) one or more access rights to the second target network node obtained by the compromising of the second target network node using the second vulnerability;

GPI25 for selecting a third target network node of the plurality of network nodes of the networked system;

GPI26 for handling the third target network node, the handling of the third target network node comprising: (a) determining a third vulnerability that can compromise the third target network node, based on the selected third target network node and based on the current assignment of the plurality of network nodes to the blue, red and purple classes, (b) checking whether compromising the third target network node using the third vulnerability would result in the attacker achieving full control of the third target network node, and (c) assigning the third target network node to the purple class in response to determining that (I) the compromising of the third target network node using the third vulnerability would not result in the attacker achieving full control of the third target network node and (II) the attacker cannot achieve full control of the third target network node by using (1) any combination of privilege escalation techniques and (2) any combination of access rights to the third target network node obtained by the compromising of the third target network node using the third vulnerability;

GPI27 for determining the way for an attacker to compromise the networked system based on at least one of the first vulnerability, the second vulnerability and the third vulnerability; and GPI28 for reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, a penetration testing system 100 comprises computing device 254, which comprises one or more processors 250 and non-transitory computer-readable storage medium 182. The penetration testing system 100 also comprises a reconnaissance agent software module 120 installed on at least some network nodes 110 of the plurality of network nodes 110. As discussed earlier, storage medium 182 includes program instructions 185 stored therein.

In some embodiments, a penetration testing system 100 comprises computing device 254, which comprises one or more processors 250 and non-transitory computer-readable storage medium 182'. The penetration testing system 100 also comprises a reconnaissance agent software module 120 installed on at least some network nodes 110 of the plurality of network nodes 110. As discussed earlier, storage medium 182' includes program instructions 186 stored therein.

Figure 8:
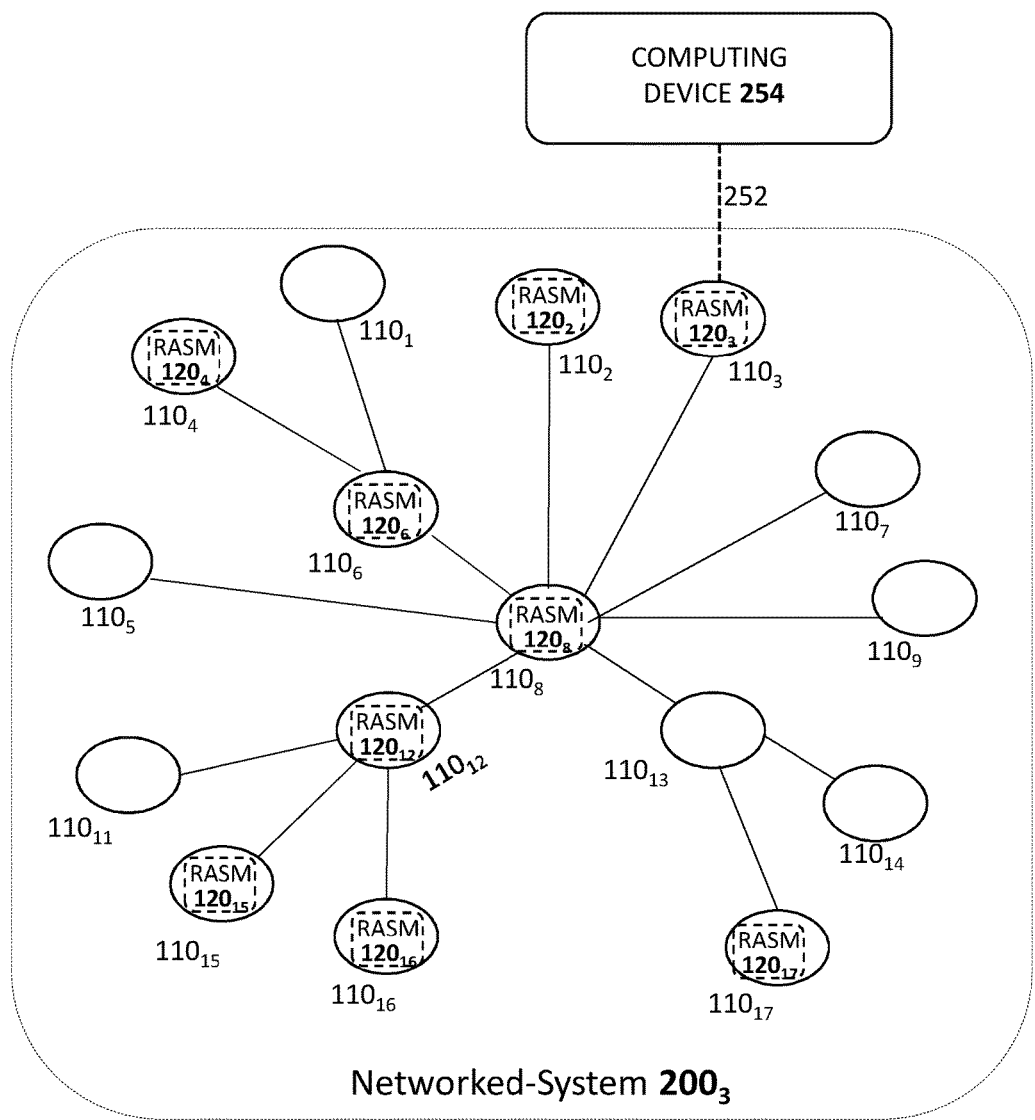
FIG. 8 is a functional block diagram of a reconnaissance agent penetration testing system which may employ embodiments of the present invention.

A schematic diagram of a networked system 200$_3$ according to embodiments is shown in FIG. 8. Networked system 200$_3$ is similar to networked system 200$_1$ as diagrammed in FIG. 3, but in networked system 200$_3$ a reconnaissance agent software module (RASM) 120 is installed on at least some of the plurality of network nodes 110 shown as part of networked system 200$_3$.

Figure 9:
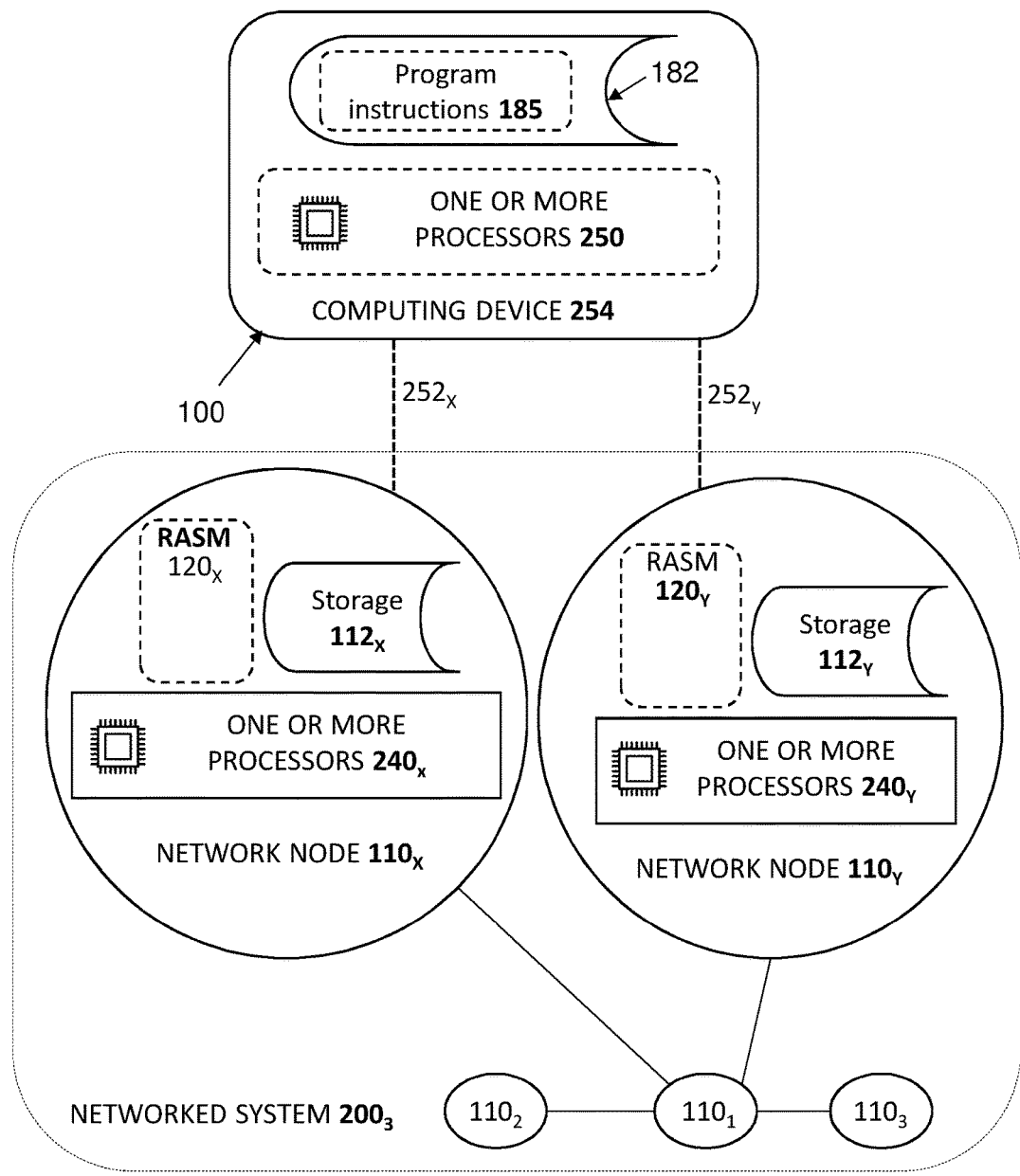
FIGS. 9 and 10 show schematic illustrations of networked systems that may be tested according to embodiments of the present invention.
Figure 10:
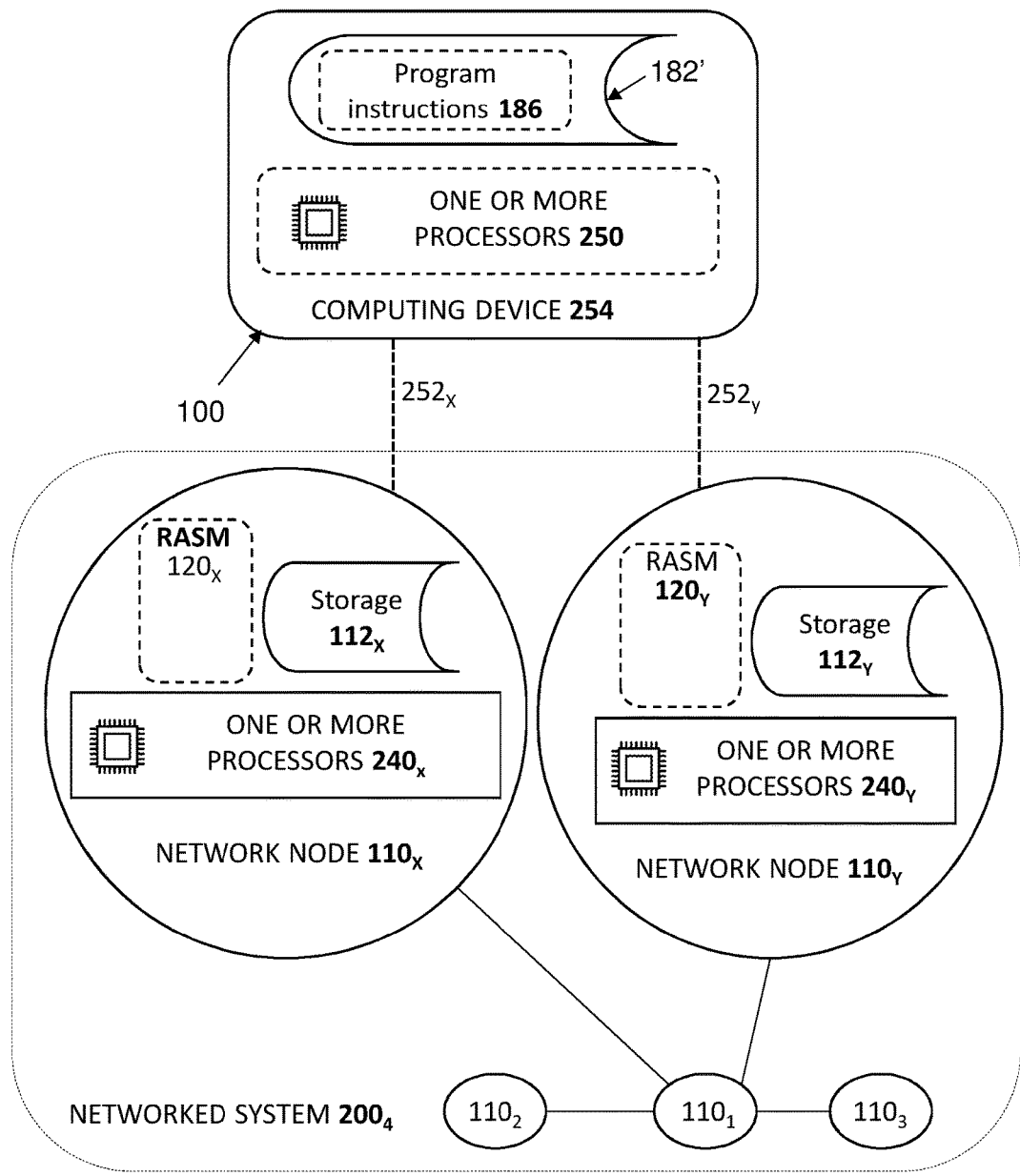

The more detailed diagram of networked system $200_3$ shown in FIG. 9 is similar to the diagram of networked system $200_1$ of FIG. 4, except that reconnaissance agent software modules $120_X$, $120_Y$ are installed in first and second network nodes $110_X$, $110_Y$. Networked system $200_4$ shown in FIG. 10 is similar to networked system $200_2$ of FIG. 6, except that reconnaissance agent software modules $120_X$, $120_Y$ are installed in first and second network nodes $110_X$, $110_Y$. As disclosed earlier, the RASM 120 can be installed in any or all of the network nodes 110. The RASMs 120, or at least some program instructions thereof, can be stored in respective storage media 112 of corresponding network nodes 110.

In each of FIGS. 9 and 10, reconnaissance-agent non-transitory computer-readable storage medium $112_X$ is associated with a first node $110_X$ and is provided for storage of instructions (not shown) of the reconnaissance agent software module for execution by one or more processors $240_X$ of the first network node $110_X$, which is in electronic communication with a remote computing device 254 (by communications arrangement $252_X$ which can be an Internet connection or a LAN connection or any other suitable connection, including an indirect connection). Storage medium $112_X$ is shown for convenience as being part of the network node $110_X$ but it can be anywhere as long as the one or more processors $240_X$ can access and execute the instructions stored therein. Similarly, reconnaissance-agent non-transitory computer-readable storage medium $112_Y$ is associated with the second node $110_Y$ and is provided for storage of instructions (not shown) of the reconnaissance agent software module for execution by one or more processors $240_Y$ of the second network node $110_Y$, which is also in electronic communication with a remote computing device 254 (by communications arrangement $252_Y$ which can be the same as communications arrangement $252_X$ or separate and/or different). Storage medium $112_Y$ is also shown for convenience as being part of the network node $110_Y$ but it can be anywhere as long as the one or more processors $240_Y$ can access and execute the instructions stored therein.

Figure 11:
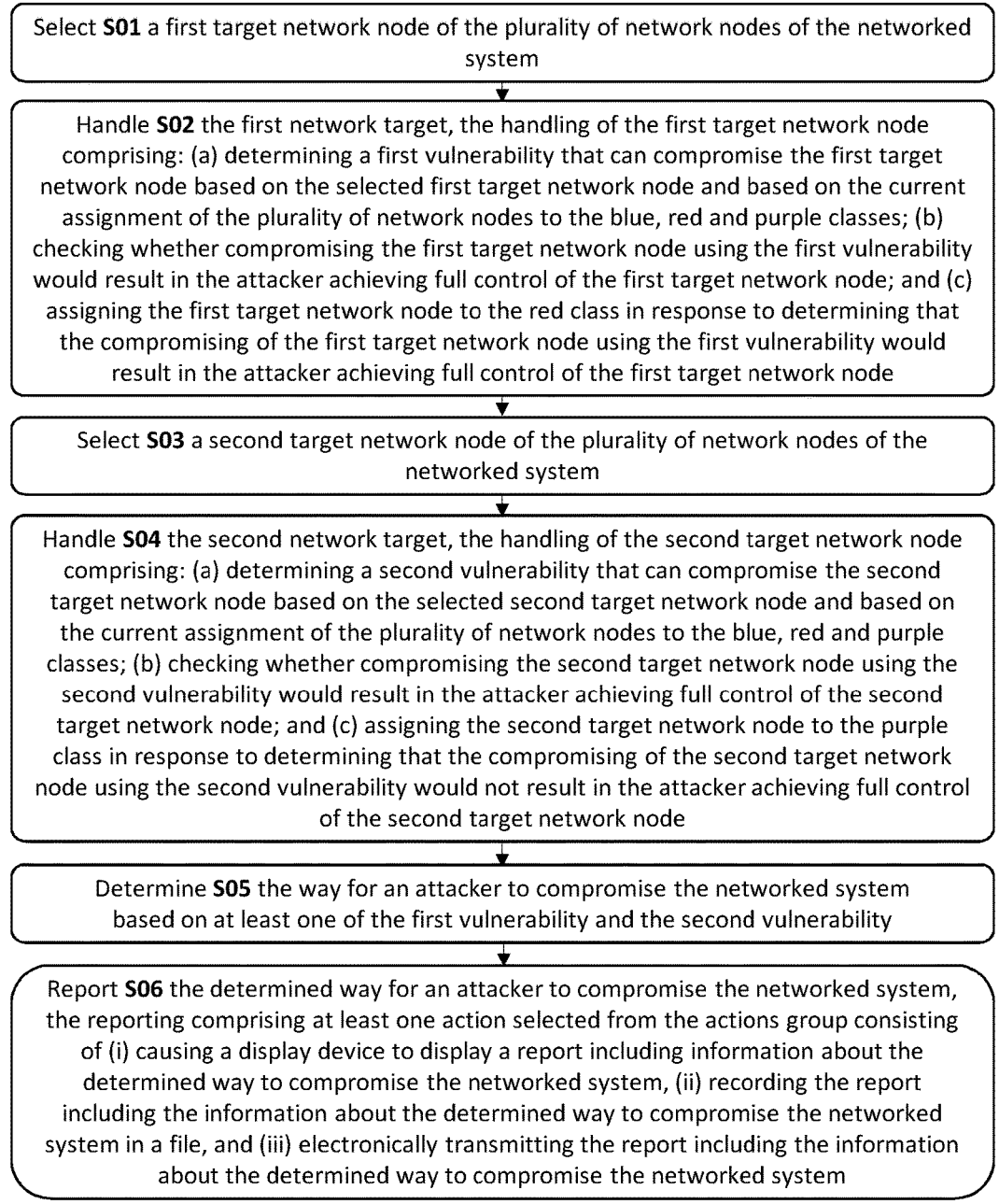

Referring now to FIG. 11, a method is disclosed for carrying out a penetration testing campaign of a networked system 200 (for example, networked system $200_2$ of FIG. 4) by a simulated penetration testing system 100 for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node. As illustrated by the flow chart in FIG. 11, the method comprises:

Step S01 Selecting a first target network node of the plurality of network nodes of the networked system. In some embodiments, the first target network node is selected from the network nodes assigned to the blue class. In some embodiments, the first target network node is selected from the network nodes assigned to the blue class or the purple class.

Step S02 Handling the first target network node, the handling of the first target network node comprising: (a) based on the selected first target network node and based on the current assignment of the plurality of network nodes to the blue, red and purple classes, determining a first vulnerability that can compromise the first target network node; (b) checking whether compromising the first target network node using the first vulnerability would result in the attacker achieving full control of the first target network node; and (c) in response to determining that the compromising of the first target network node using the first vulnerability would result in the attacker achieving full control of the first target network node, assigning the first target network node to the red class. In some embodiments of the method, a reconnaissance agent software module is installed on at least some network nodes of the plurality of network nodes, and the determining of the first vulnerability that can compromise the first target network node is further based on data received from the reconnaissance agent software module installed on the first target network node.

Step S03 selecting a second target network node of the plurality of network nodes of the networked system.

Step S04 handling the second target network node, the handling of the second target network node comprising: (a) based on the selected second target network node and based on the current assignment of the plurality of network nodes to the blue, red and purple classes, determining a second vulnerability that can compromise the second target network node; (b) checking whether compromising the second target network node using the second vulnerability would result in the attacker achieving full control of the second target network node; and (c) in response to determining that the compromising of the second target network node using the second vulnerability would not result in the attacker achieving full control of the second target network node, assigning the second target network node to the purple class. In some embodiments, the assigning of the second target network node to the purple class comprises associating with the second target network node all access rights that would be available to the attacker after using the second vulnerability to compromise the second target network node. The selecting of the first target network node can be based on at least one access right associated with a network node currently assigned to the purple class. The determining of the first vulnerability can be further based on at least one access right associated with a network node currently assigned to the purple class.

Step S05 based on at least one of the first vulnerability and the second vulnerability, determining the way for an attacker to compromise the networked system.

Step S06 reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

Referring now to FIGS. 12A and 12B in combination, a method is disclosed for carrying out a penetration testing campaign of a networked system 200 (for example, networked system $200_4$ of FIG. 10) by a simulated penetration testing system 100 for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node. As illustrated by the flow chart in FIGS. 12A-12B, the method comprises:

Step S11 Selecting a first target network node of the plurality of network nodes of the networked system. In some embodiments, the first target network node is selected from the network nodes assigned to the blue class. In some embodiments, the first target network node is selected from the network nodes assigned to the blue class or the purple class.

Step S12 Handling the first target network node, the handling of the first target network node comprising: (a) based on the selected first target network node and based on the current assignment of the plurality of network nodes to the blue, red and purple classes, determining a first vulnerability that can compromise the first target network node; (b) checking whether compromising the first target network node using the first vulnerability would result in the attacker achieving full control of the first target network node; and (c) in response to determining that the compromising of the first target network node using the first vulnerability would result in the attacker achieving full control of the first target network node, assigning the first target network node to the red class. In some embodiments of the method, a reconnaissance agent software module is installed on at least some network nodes of the plurality of network nodes, and the determining of the first vulnerability that can compromise the first target network node is further based on data received from the reconnaissance agent software module installed on the first target network node.

Step S13 selecting a second target network node of the plurality of network nodes of the networked system.

Step S14 handling the second target network node, the handling of the second target network node comprising: (a) based on the selected second target network node and based on the current assignment of the plurality of network nodes to the blue, red and purple classes, determining a second vulnerability that can compromise the second target network node; (b) checking whether compromising the second target network node using the second vulnerability would result in the attacker achieving full control of the second target network node; and (c) in response to determining that (i) the compromising of the second target network node using the second vulnerability would not result in the attacker achieving full control of the second target network node and (ii) the attacker would be able to achieve full control of the second target network node by using (A) one or more privilege escalation techniques and (B) one or more access rights to the second target network node obtained by the compromising of the second target network node using the second vulnerability, assigning the second target network node to the red class.

Step S15 Selecting a third target network node of the plurality of network nodes of the networked system.

Step S16 handling the third target network node, the handling of the third target network node comprising: (a) based on the selected third target network node and based on the current assignment of the plurality of network nodes to the blue, red and purple classes, determining a third vulnerability that can compromise the third target network node; (b) checking whether compromising the third target network node using the third vulnerability would result in the attacker achieving full control of the third target network node; and (c) in response to determining that (i) the compromising of the third target network node using the third vulnerability would not result in the attacker achieving full control of the third target network node and (ii) the attacker cannot achieve full control of the third target network node by using (A) any combination of privilege escalation techniques and (B) any combination of access rights to the third target network node obtained by the compromising of the third target network node using the third vulnerability, assigning the third target network node to the purple class.

Step S17 based on at least one of the first vulnerability, the second vulnerability and the third vulnerability, determining the way for an attacker to compromise the networked system.

Step S18 reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "attacker" or "threat actor"—An entity, whether a single person, a group of persons or an organization, that might conduct an attack against a networked system by penetrating it for uncovering its security vulnerabilities and/or for compromising it.

21. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

22. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

23. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

24. "a lateral movement strategy of an attacker"—A decision logic applied by the attacker of a campaign for selecting the next network node to try to compromise.

During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is an immediate neighbor of the last network node that was compromised that is not yet compromised (provided such neighbor node exists).

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection.

Typically, an attacker uses a single lateral movement strategy during an attack.

25. "network nodes A and B are immediate neighbors of each other"-Network nodes A and B have a direct communication link between them that does not pass through any other network node.

26. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

27. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

28. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

29. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

30. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

31. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

32. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

33. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

34. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

35. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

36. "resource of a network node"—A file in the network node, a folder in the network node, credentials of a user residing in the network node (the credentials not necessarily applying to the network node containing the credentials), a peripheral device of the network node or a communication device accessible to the network node.

37. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

38. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

The term "access rights" in the plural may be used even if only a single right is involved (e.g. when a user has only a right to read a single file in the network node).

39. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

40. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

41. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

42. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

43. "session-hijacking attack"—a cyber-attack where a valid communication session between two network nodes in a networked system is used by an attacker to gain unauthorized access to information or services in the networked computer system.

44. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

45. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

46. "administrator of a network node"—Any person that is authorized, among other things, to define or change at least one rule controlling at least one of an access right, a permission, a priority and a configuration in the network node.

47. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

48. "achieving full control of a computing device"—For a multi-user computing device that distinguishes between administrator and non-administrator users, logging into the computing device with administrator access rights. For a single-user computing device, logging into the computing device as the single user.

49. "privilege escalation"—An act of exploiting a bug, a design flaw or a configuration oversight in an operating system or a software application in order to gain additional access rights to resources in a network node on top of previously held access rights (if any). The result of applying privilege escalation in a network node is that the entity applying it (whether a legitimate user or an illegitimate attacker) can now perform unauthorized actions that were not available to him prior to applying the privilege escalation.

50. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

51. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

52. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

53. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

54. "selecting a link"—Making an operation by a user that causes following the link to a destination pointed to by the link. Typically, selecting a link is achieved by pointing a visible cursor to the link and clicking a button on a pointing device (e.g. a mouse). However, there are other ways of selecting a link, for example by moving a selection indicator until the link is marked as selected and then hitting a selection button (e.g. an "Enter" button in a keyboard or an "OK" button in a remote-control device).

55. "opening a file"—If the file is an executable file, then opening it means executing it. If the file is not an executable file, then opening it means creating by the operating system at least one data structure associated with the file, the one or more data structures used for enabling a software application to read or write data from/to the file.

56. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

57. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

58. "random selection"—A selection that depends on a random or pseudo-random factor. Different possible outcomes in a random selection do not necessarily have the same probabilities of being selected.

59. "blocking an attacker step", "blocking a vulnerability"—Making the attacker step or the exploitation of the vulnerability (as the case may be) practically unavailable, more expensive, more difficult, less efficient and/or less useful to attackers. The blocking of the attacker step or the exploitation of the vulnerability is done by implementing a remediation action.

60. "a Boolean condition"—A statement that can have a value of either true or false. If the statement is true, we say that the Boolean condition is satisfied. If the statement is false, we say that the Boolean condition is not satisfied.

61. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

62. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

63. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

64. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

The invention claimed is:

1. A method of carrying out a penetration testing campaign of a networked system by a simulated penetration testing system for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node, the method comprising:

a. selecting a first target network node of the plurality of network nodes of the networked system;
   b. handling the first target network node, the handling of the first target network node comprising:
      i. based on the selected first target network node and based on the current assignment of the plurality of network nodes to the blue, red and purple classes, determining a first vulnerability that can compromise the first target network node;
      ii. checking whether compromising the first target network node using the first vulnerability would result in the attacker achieving full control of the first target network node; and
      iii. in response to determining that the compromising of the first target network node using the first vulnerability would result in the attacker achieving full control of the first target network node, assigning the first target network node to the red class;
   c. selecting a second target network node of the plurality of network nodes of the networked system;
   d. handling the second target network node, the handling of the second target network node comprising:
      i. based on the selected second target network node and based on the current assignment of the plurality of network nodes to the blue, red and purple classes, determining a second vulnerability that can compromise the second target network node;
      ii. checking whether compromising the second target network node using the second vulnerability would result in the attacker achieving full control of the second target network node; and
      iii. in response to determining that (i) the compromising of the second target network node using the second vulnerability would not result in the attacker achieving full control of the second target network node and (ii) the attacker would be able to achieve full control of the second target network node by using (A) one or more privilege escalation techniques and (B) one or more access rights to the second target network node obtained by the compromising of the second target network node using the second vulnerability, assigning the second target network node to the red class;
e. selecting a third target network node of the plurality of network nodes of the networked system;
f. handling the third target network node, the handling of the third target network node comprising:
  i. based on the selected third target network node and based on the current assignment of the plurality of network nodes to the blue, red and purple classes, determining a third vulnerability that can compromise the third target network node;
  ii. checking whether compromising the third target network node using the third vulnerability would result in the attacker achieving full control of the third target network node; and
  iii. in response to determining that (i) the compromising of the third target network node using the third vulnerability would not result in the attacker achieving full control of the third target network node and (ii) the attacker cannot achieve full control of the third target network node by using (A) any combination of privilege escalation techniques and (B) any combination of access rights to the third target network node obtained by the compromising of the third target network node using the third vulnerability, assigning the third target network node to the purple class;
g. based on at least one of the first vulnerability, the second vulnerability and the third vulnerability, determining the way for an attacker to compromise the networked system; and
h. reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

2. The method of claim 1, wherein the assigning of the third target network node to the purple class comprises associating with the third target network node all access rights that would be available to the attacker after using the third vulnerability to compromise the third target network node.

3. The method of claim 1, wherein the first target network node is selected from the network nodes assigned to the blue class.

4. The method of claim 1, wherein the first target network node is selected from the network nodes assigned to the blue class or the purple class.

5. The method of claim 1, wherein (i) a reconnaissance agent software module is installed on at least some network nodes of the plurality of network nodes, and (ii) the determining of the first vulnerability that can compromise the first target network node is based on data received from the reconnaissance agent software module installed on the first target network node.

6. A simulated penetration testing system for carrying out a penetration testing campaign of a networked system for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node, the penetration testing system comprising:
  a. a computing device comprising one or more processors, the computing device in networked communication with multiple network nodes of the networked system; and
  b. a non-transitory computer-readable storage medium containing program instructions, wherein execution of the program instructions by the one or more processors of the computing device causes the one or more processors of the computing device to carry out the following steps:
    i. selecting a first target network node of the plurality of network nodes of the networked system;
    ii. handling the first target network node, the handling of the first target network node comprising:
      A. based on the selected first target network node and based on the current assignment of the plurality of network nodes to the blue, red and purple classes, determining a first vulnerability that can compromise the first target network node;
      B. checking whether compromising the first target network node using the first vulnerability would result in the attacker achieving full control of the first target network node; and
      C. in response to determining that the compromising of the first target network node using the first vulnerability would result in the attacker achieving full control of the first target network node, assigning the first target network node to the red class;
    iii. selecting a second target network node of the plurality of network nodes of the networked system;
    iv. handling the second target network node, the handling of the second target network node comprising:
      A. based on the selected second target network node and based on the current assignment of the plurality of network nodes to the blue, red and purple classes, determining a second vulnerability that can compromise the second target network node;
      B. checking whether compromising the second target network node using the second vulnerability would result in the attacker achieving full control of the second target network node; and
      C. in response to determining that (I) the compromising of the second target network node using the second vulnerability would not result in the attacker achieving full control of the second target network node and (II) the attacker would be able to achieve full control of the second target network node by using (1) one or more privilege escalation techniques and (2) one or more access rights to the second target network node obtained by the compromising of the second target network node using the second vulnerability, assigning the second target network node to the red class;
v. selecting a third target network node of the plurality of network nodes of the networked system;
vi. handling the third target network node, the handling of the third target network node comprising:
A. based on the selected third target network node and based on the current assignment of the plurality of network nodes to the blue, red and purple classes, determining a third vulnerability that can compromise the third target network node;
B. checking whether compromising the third target network node using the third vulnerability would result in the attacker achieving full control of the third target network node; and
C. in response to determining that (I) the compromising of the third target network node using the third vulnerability would not result in the attacker achieving full control of the third target network node and (II) the attacker cannot achieve full control of the third target network node by using (1) any combination of privilege escalation techniques and (2) any combination of access rights to the third target network node obtained by the compromising of the third target network node using the third vulnerability, assigning the third target network node to the purple class;
vii. based on at least one of the first vulnerability, the second vulnerability and the third vulnerability, determining the way for an attacker to compromise the networked system; and
viii. reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

7. The simulated penetration testing system of claim 6, wherein the assigning of the third target network node to the purple class comprises associating with the third target network node all access rights that would be available to the attacker after using the third vulnerability to compromise the third target network node.

8. The simulated penetration testing system of claim 6, wherein the first target network node is selected from the network nodes assigned to the blue class.

9. The simulated penetration testing system of claim 6, wherein the first target network node is selected from the network nodes assigned to the blue class or the purple class.

10. The simulated penetration testing system of claim 6, additionally comprising:
c. a reconnaissance agent software module installed on at least some network nodes of the plurality of network nodes,
wherein the determining of the first vulnerability that can compromise the first target network node is based on data received from the reconnaissance agent software module installed on the first target network node.

11. A method of carrying out a penetration testing campaign of a networked system by a simulated penetration testing system for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node, the method comprising:
a. selecting a first target network node of the plurality of network nodes of the networked system;
b. handling the first target network node, the handling of the first target network node comprising:
i. based on the selected first target network node and based on the current assignment of the plurality of network nodes to the blue, red and purple classes, determining a first vulnerability that can compromise the first target network node;
ii. checking whether compromising the first target network node using the first vulnerability would result in the attacker achieving full control of the first target network node; and
iii. in response to determining that the compromising of the first target network node using the first vulnerability would result in the attacker achieving full control of the first target network node, assigning the first target network node to the red class;
c. selecting a second target network node of the plurality of network nodes of the networked system;
d. handling the second target network node, the handling of the second target network node comprising:
i. based on the selected second target network node and based on the current assignment of the plurality of network nodes to the blue, red and purple classes, determining a second vulnerability that can compromise the second target network node;
ii. checking whether compromising the second target network node using the second vulnerability would result in the attacker achieving full control of the second target network node; and
iii. in response to determining that the compromising of the second target network node using the second vulnerability would not result in the attacker achieving full control of the second target network node, assigning the second target network node to the purple class;
e. based on at least one of the first vulnerability and the second vulnerability, determining the way for an attacker to compromise the networked system; and
f. reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

12. The method of claim 11, wherein the assigning of the second target network node to the purple class comprises associating with the second target network node all access rights that would be available to the attacker after using the second vulnerability to compromise the second target network node.

13. The method of claim 11, wherein the first target network node is selected from the network nodes assigned to the blue class.

14. The method of claim 11, wherein the first target network node is selected from the network nodes assigned to the blue class or the purple class.

15. The method of claim 11, wherein (i) a reconnaissance agent software module is installed on at least some network nodes of the plurality of network nodes, and (ii) the determining of the first vulnerability that can compromise the first target network node is based on data received from the reconnaissance agent software module installed on the first target network node.

16. A simulated penetration testing system for carrying out a penetration testing campaign of a networked system for the purpose of determining a way for an attacker to compromise the networked system, wherein the simulated penetration testing system assigns a plurality of network nodes of the networked system to classes based on current information about the compromisability of the plurality of network nodes at a current state of the penetration testing campaign, the classes consisting of (i) a red class, wherein each network node that is a member of the red class is known to be compromisable by the attacker in a way that gives the attacker full control of the red-class-member network node, (ii) a blue class, wherein each network node that is a member of the blue class is not known to be compromisable by the attacker, and (iii) a purple class, wherein each network node that is a member of the purple class is known to be compromisable by the attacker in a way that does not give the attacker full control of the purple-class-member network node, the penetration testing system comprising:

a. a computing device comprising one or more processors, the computing device in networked communication with multiple network nodes of the networked system; and b. a non-transitory computer-readable storage medium containing program instructions, wherein execution of the program instructions by the one or more processors of the computing device causes the one or more processors of the computing device to carry out the following steps:

i. selecting a first target network node of the plurality of network nodes of the networked system;

ii. handling the first target network node, the handling of the first target network node comprising:

A. based on the selected first target network node and based on the current assignment of the plurality of network nodes to the blue, red and purple classes, determining a first vulnerability that can compromise the first target network node;

B. checking whether compromising the first target network node using the first vulnerability would result in the attacker achieving full control of the first target network node; and C. in response to determining that the compromising of the first target network node using the first vulnerability would result in the attacker achieving full control of the first target network node, assigning the first target network node to the red class;

iii. selecting a second target network node of the plurality of network nodes of the networked system;

iv. handling the second target network node, the handling of the second target network node comprising:

A. based on the selected second target network node and based on the current assignment of the plurality of network nodes to the blue, red and purple classes, determining a second vulnerability that can compromise the second target network node;

B. checking whether compromising the second target network node using the second vulnerability would result in the attacker achieving full control of the second target network node; and C. in response to determining that the compromising of the second target network node using the second vulnerability would not result in the attacker achieving full control of the second target network node, assigning the second target network node to the purple class;

v. based on at least one of the first vulnerability and the second vulnerability, determining the way for an attacker to compromise the networked system; and vi. reporting the determined way for an attacker to compromise the networked system, the reporting comprising at least one action selected from the actions group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

17. The simulated penetration testing system of claim 16, wherein the assigning of the second target network node to the purple class comprises associating with the second target network node all access rights that would be available to the attacker after using the second vulnerability to compromise the second target network node.

18. The simulated penetration testing system of claim 16, wherein the first target network node is selected from the network nodes assigned to the blue class.

19. The simulated penetration testing system of claim 16, wherein the first target network node is selected from the network nodes assigned to the blue class or the purple class.

20. The simulated penetration testing system of claim 16, additionally comprising:

c. a reconnaissance agent software module installed on at least some network nodes of the plurality of network nodes, wherein the determining of the first vulnerability that can compromise the first target network node is based on data received from the reconnaissance agent software module installed on the first target network node.

* * * * *